US011082929B2

(12) United States Patent
Fakoorian et al.

(10) Patent No.: US 11,082,929 B2
(45) Date of Patent: Aug. 3, 2021

(54) OUTER-LOOP FEEDBACK SUPPORT FOR LOW ERROR RATES

(71) Applicant: QUALCOMM Incorporated, San Diego, CA (US)

(72) Inventors: Seyed Ali Akbar Fakoorian, San Diego, CA (US); Jing Sun, San Diego, CA (US); Jing Jiang, San Diego, CA (US); Xiaoxia Zhang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/694,610

(22) Filed: Nov. 25, 2019

(65) Prior Publication Data

US 2020/0169962 A1 May 28, 2020

Related U.S. Application Data

(60) Provisional application No. 62/772,536, filed on Nov. 28, 2018.

(51) Int. Cl.
*H04W 52/20* (2009.01)
*H04W 52/12* (2009.01)
(Continued)

(52) U.S. Cl.
CPC .......... *H04W 52/20* (2013.01); *H04B 17/336* (2015.01); *H04L 1/0003* (2013.01);
(Continued)

(58) Field of Classification Search
CPC ... H04L 1/0003; H04L 1/0015; H04L 1/0026; H04L 1/0035; H04L 1/0054;
(Continued)

(56) References Cited

U.S. PATENT DOCUMENTS

2006/0282662 A1* 12/2006 Whitcomb .......... H04L 63/0884
713/156
2010/0111198 A1* 5/2010 Lakus-Becker ...... H04N 19/647
375/240.27
(Continued)

OTHER PUBLICATIONS

International Search Report and Written Opinion—PCT/US2019/063342—ISA/EPO—dated Mar. 18, 2020.
(Continued)

*Primary Examiner* — Tan H Trinh
(74) *Attorney, Agent, or Firm* — Holland & Hart LLP

(57) ABSTRACT

Methods, systems, and devices for wireless communications are described which may enable a user equipment (UE) and a base station to use outer-loop feedback support to reach a desired error rate for low latency communications. For example, a base station may transmit a proxy acknowledgement feedback configuration to a UE for communications associated with a low target error rate. In some cases, after receiving the communications from the base station, the UE may receive secondary communications from the base station. The UE may then decode the first and/or second communications according to the proxy acknowledgement feedback configuration and/or a normal acknowledgement feedback configuration and may determine a proxy acknowledgement feedback based on the decoding. Further, the UE may transmit the proxy and/or normal acknowledgement feedback to the base station, which may update outer-loop power settings for the low latency communications based on the acknowledgement feedback.

26 Claims, 20 Drawing Sheets

(51) Int. Cl.

| | | |
|---|---|---|
| *H04W 52/26* | (2009.01) | |
| *H04W 72/04* | (2009.01) | |
| *H04W 28/02* | (2009.01) | |
| *H04L 1/00* | (2006.01) | |
| *H04L 5/10* | (2006.01) | |
| *H04L 27/22* | (2006.01) | |
| *H04B 17/336* | (2015.01) | |
| *H04L 5/00* | (2006.01) | |
| *H04W 76/27* | (2018.01) | |

(52) U.S. Cl.
CPC .......... *H04L 1/0026* (2013.01); *H04L 1/0054* (2013.01); *H04L 5/0055* (2013.01); *H04L 27/22* (2013.01); *H04W 28/0268* (2013.01); *H04W 52/125* (2013.01); *H04W 52/265* (2013.01); *H04W 72/0406* (2013.01); *H04W 76/27* (2018.02)

(58) Field of Classification Search
CPC ....... H04L 1/1858; H04L 1/189; H04L 1/203; H04L 2001/0093; H04L 27/22; H04L 5/0055; H04W 28/0268; H04W 52/125; H04W 52/20; H04W 52/265; H04W 72/0406; H04W 76/27; H04B 17/336
USPC .......... 455/69, 522; 370/216, 311, 328, 329; 714/776
See application file for complete search history.

(56) References Cited

U.S. PATENT DOCUMENTS

| | | | | |
|---|---|---|---|---|
| 2010/0182951 A1* | 7/2010 | Park | ...................... | H04L 1/1812 370/328 |
| 2012/0120858 A1* | 5/2012 | Das | ................... | H04W 52/0229 370/311 |
| 2012/0230268 A1* | 9/2012 | Marinier | ........... | H04W 72/0413 370/329 |
| 2014/0226457 A1* | 8/2014 | Hsueh | ...................... | H04L 43/50 370/216 |
| 2015/0326252 A1* | 11/2015 | Bisplinghoff | ......... | H04L 1/0058 714/776 |
| 2016/0000228 A1* | 1/2016 | Restrepo | ................... | A47C 4/12 297/188.1 |
| 2016/0127997 A1* | 5/2016 | Ang | ...................... | H04W 76/28 370/311 |
| 2016/0128090 A1* | 5/2016 | Azarian Yazdi | ...... | H04L 5/0062 370/329 |
| 2016/0337072 A1* | 11/2016 | Yang | ................... | H04W 72/042 |
| 2018/0176656 A1* | 6/2018 | Baudoin | ............ | H04N 21/6193 |
| 2018/0262398 A1* | 9/2018 | Chen | ..................... | H04L 5/0055 |
| 2018/0302128 A1* | 10/2018 | Akkarakaran | ......... | H04L 1/1864 |
| 2019/0116560 A1* | 4/2019 | Naderializadeh | ..... | H04W 24/02 |
| 2019/0174440 A1* | 6/2019 | Kwak | ...................... | H04L 25/00 |
| 2019/0222967 A1* | 7/2019 | Ratilainen | ............. | H04L 1/0011 |
| 2019/0223033 A1* | 7/2019 | Nam | ...................... | H04B 7/0689 |
| 2019/0347147 A1* | 11/2019 | Loukissas | ............. | G06F 16/178 |
| 2020/0007270 A1* | 1/2020 | Wikstrom | ......... | H04W 72/0413 |

OTHER PUBLICATIONS

Ohseki T., et al., "Fast Outer-loop Link Adaptation Scheme Realizing Low-latency Transmission in LTE-Advanced and Future Wireless Networks", 2016 IEEE Radio and Wireless Symposium, (RWS), IEEE, Jan. 24, 2016 (Jan. 24, 2016), pp. 1-3, XP032888104, DOI: 10.1109/RWS.2016.7444346, [retrieved on Mar. 30, 2016], the whole document.

* cited by examiner

OUTER-LOOP FEEDBACK SUPPORT FOR LOW ERROR RATES

CROSS REFERENCE

The present application for patent claims the benefit of U.S. Provisional Patent Application No. 62/772,536 by FAKOORIAN, et al., entitled "OUTER-LOOP FEEDBACK SUPPORT FOR LOW ERROR RATES," filed Nov. 28, 2018, which is assigned to the assignee hereof, and expressly incorporated by reference herein.

BACKGROUND

The following relates generally to wireless communications, and more specifically to outer-loop feedback support for low error rates.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communication systems, different services may support different reliability and latency requirements. For example, ultra-reliable low latency communications (URLLC) may be implemented for high reliability data transmissions with a short delay (e.g., low latency) between receiving a data request and sending the data transmission. Additionally, the different services may include different target error rates (e.g., a block error rate (BLER)) that indicate how successfully data is transmitted from a base station to a UE (e.g., how reliable the data is transmitted). For example, a lower target error rate may indicate a more reliable data transmission based on a lower error rate of transport blocks that are not successfully received by the UE. In some cases, the target error rate may ensure reliability for corresponding data transmissions in scenarios such as where data retransmission opportunities are limited, the latency requirements are stringent (e.g., reducing the chances for retransmissions), or similar scenarios.

A transmitting device, such as a base station, may also regulate the power used in its transmissions to a UE through various feedback mechanisms. One such feedback mechanism is an outer-loop feedback support mechanism (e.g., outer-loop link adaptation (OLLA) techniques) used to modify power settings. The outer-loop feedback support mechanism uses feedback information received from the UE as a basis for adjusting the power settings. One parameter or type of feedback information received from the UE that may be used in the outer-loop feedback support mechanism is a measured error rate with respect to a target error rate. When the target error rate is high, convergence by the outer-loop feedback support mechanism may happen relatively quickly. However, when the target error rate is low, convergence may take longer (e.g., may require more than one round of transmissions with feedback support). In low-latency, ultra-reliability circumstances (e.g., for URLLC) where target error rates are low and where a number of allowed retransmissions may be zero or very few, convergence may not occur. Methods are desired for allowing outer-loop feedback support convergence even when a target error rate is low.

SUMMARY

The described techniques relate to improved methods, systems, devices, and apparatuses that support outer-loop feedback support for low error rates. Generally, the described techniques provide for enabling a user equipment (UE) and a base station to use outer-loop feedback effectively even when a desired target error rate (e.g., block error rate (BLER)) is low and is associated with low latency wireless communications (e.g., ultra-reliable low latency communications (URLLC)). For example, a UE may be configured to communicate with a base station via communications associated with a low target error rate (e.g., with a BLER less than 1%). The base station may transmit a proxy acknowledgement (ACK) feedback configuration (e.g., traditional hybrid automatic repeat request (HARQ) ACK feedback, soft ACK feedback, etc.) to the UE for the communications such that the UE may transmit feedback for the communications with respect to both the low target error rate and a proxy target error rate. After receiving the communications, the UE may transmit ACK feedback based on the low target error rate as well as based on the proxy ACK feedback configuration. Additionally, the ACK feedback based on the proxy ACK feedback configuration may correspond to a proxy target error rate that is higher than the low target error rate. The base station may then control the outer-loop feedback for the communications based on the ACK feedback from the proxy ACK feedback configuration. In some cases, the proxy ACK feedback configuration may include a configuration for a partial decoding of the communications based on a number of log likelihood ratios (LLRs) to be decoded (where the number is less than the total number of LLRs in the communications) and/or an intermediate decoding based on a number of iterations less than a total number of iterations used for fully decoding the low latency communications.

Additionally or alternatively, the base station may transmit a second wireless communication to the UE with a second target error rate that is greater than the low target error rate for the low latency communications. In some cases, the second wireless communication may include enhanced mobile broadband (eMBB) traffic, dummy eMBB traffic, or broadcasted channel transmissions. Following the transmissions of both wireless communications, the UE may decode the low latency and/or second communications and transmit ACK feedback for the second wireless communications to the base station. The base station may then maintain an outer-loop feedback for the second wireless communications and adjust an outer-loop for the low latency communications based on the ACK feedback for the second wireless communications.

A method of wireless communications at a UE is described. The method may include receiving, from a base station, a proxy ACK feedback configuration for communications associated with a target error rate that is below a threshold target error rate; receiving, from the base station, the communications associated with the target error rate; transmitting, to the base station, a first ACK feedback for the communications based on the target error rate and on decoding the communications; and transmitting, to the base station, a second ACK feedback for the communications based on the proxy ACK feedback configuration, where the second ACK feedback is associated with a proxy target error rate that is greater than the target error rate.

An apparatus for wireless communications at a UE is described. The apparatus may include a processor, memory in electronic communication with the processor, and instructions stored in the memory. The instructions may be executable by the processor to cause the apparatus to receive, from a base station, a proxy ACK feedback configuration for communications associated with a target error rate that is below a threshold target error rate; receive, from the base station, the communications associated with the target error rate; transmit, to the base station, a first ACK feedback for the communications based on the target error rate and on decoding the communications; and transmit, to the base station, a second ACK feedback for the communications based on the proxy ACK feedback configuration, where the second ACK feedback is associated with a proxy target error rate that is greater than the target error rate.

Another apparatus for wireless communications at a UE is described. The apparatus may include means for receiving, from a base station, a proxy ACK feedback configuration for communications associated with a target error rate that is below a threshold target error rate; means for receiving, from the base station, the communications associated with the target error rate; means for transmitting, to the base station, a first ACK feedback for the communications based on the target error rate and on decoding the communications; and means for transmitting, to the base station, a second ACK feedback for the communications based on the proxy ACK feedback configuration, where the second ACK feedback is associated with a proxy target error rate that is greater than the target error rate.

A non-transitory computer-readable medium storing code for wireless communications at a UE is described. The code may include instructions executable by a processor to receive, from a base station, a proxy ACK feedback configuration for communications associated with a target error rate that is below a threshold target error rate; receive, from the base station, the communications associated with the target error rate; transmit, to the base station, a first ACK feedback for the communications based on the target error rate and on decoding the communications; and transmit, to the base station, a second ACK feedback for the communications based on the proxy ACK feedback configuration, where the second ACK feedback is associated with a proxy target error rate that is greater than the target error rate.

Some examples of the method, apparatuses, and non-transitory computer-readable medium described herein may further include operations, features, means, or instructions for receiving an indication that the UE is to determine the second ACK feedback based on a subset of LLRs to be used for the communications.

Some examples of the method, apparatuses, and non-transitory computer-readable medium described herein may further include operations, features, means, or instructions for receiving, via the indication, a proxy down-sampling rate that may be less than a down-sampling rate of the communications; decoding the communications according to the proxy down-sampling rate, where the subset of LLRs includes LLRs decoded in accordance with the proxy down-sampling rate; and determining the second ACK feedback based on the decoding in accordance with the proxy down-sampling rate.

Some examples of the method, apparatuses, and non-transitory computer-readable medium described herein may further include operations, features, means, or instructions for decoding a random selection of LLRs of the communications, where the subset of LLRs includes the random selection of LLRs, and determining the second ACK feedback based on the decoding of the random selection of LLRs.

In some examples of the method, apparatuses, and non-transitory computer-readable medium described herein, receiving the indication may include operations, features, means, or instructions for receiving the indication as part of the proxy ACK feedback configuration via radio resource control (RRC) signaling or as part of a downlink control information (DCI) message.

Some examples of the method, apparatuses, and non-transitory computer-readable medium described herein may further include operations, features, means, or instructions for receiving an indication that the UE is to determine the second ACK feedback based on an intermediate decoding of the communications.

Some examples of the method, apparatuses, and non-transitory computer-readable medium described herein may further include operations, features, means, or instructions for receiving, via the indication, a number of decoding iterations to be used for the intermediate decoding, where the number of decoding iterations is less than a total number of decoding iterations to be used by the UE for decoding an entirety of the communications and is associated with the intermediate decoding; decoding the communications according to the number of decoding iterations; and determining the second ACK feedback based on the decoding by the number of decoding iterations.

In some examples of the method, apparatuses, and non-transitory computer-readable medium described herein, receiving the indication may include operations, features, means, or instructions for receiving the indication as part of the proxy ACK feedback configuration via RRC signaling or as part of a DCI message.

In some examples of the method, apparatuses, and non-transitory computer-readable medium described herein, the number of decoding iterations may correspond to the proxy target error rate that is greater than the target error rate.

Some examples of the method, apparatuses, and non-transitory computer-readable medium described herein may further include operations, features, means, or instructions for multiplexing the first ACK feedback with the second ACK feedback.

In some examples of the method, apparatuses, and non-transitory computer-readable medium described herein, the second ACK feedback may be transmitted less frequently than the first ACK feedback.

In some examples of the method, apparatuses, and non-transitory computer-readable medium described herein, the communications associated with the target error rate that is below the threshold target error rate may include URLLC.

A method of wireless communications at a base station is described. The method may include transmitting, to a UE, a proxy ACK feedback configuration for communications associated with a target error rate that is below a threshold target error rate; transmitting, to the UE, the communications associated with the target error rate; receiving, from the UE, first ACK feedback for the communications based on the target error rate and on a result of the UE decoding the communications; and receiving, from the UE, a second ACK feedback for the communications based on the proxy ACK feedback configuration, where the second ACK feedback is associated with a proxy target error rate that is greater than the target error rate.

An apparatus for wireless communications at a base station is described. The apparatus may include a processor, memory in electronic communication with the processor, and instructions stored in the memory. The instructions may be executable by the processor to cause the apparatus to transmit, to a UE, a proxy ACK feedback configuration for communications associated with a target error rate that is below a threshold target error rate; transmit, to the UE, the communications associated with the target error rate; receive, from the UE, first ACK feedback for the communications based on the target error rate and on a result of the UE decoding the communications; and receive, from the UE, a second ACK feedback for the communications based on the proxy ACK feedback configuration, where the second ACK feedback is associated with a proxy target error rate that is greater than the target error rate.

Another apparatus for wireless communications at a base station is described. The apparatus may include means for transmitting, to a UE, a proxy ACK feedback configuration for communications associated with a target error rate that is below a threshold target error rate; means for transmitting, to the UE, the communications associated with the target error rate; means for receiving, from the UE, first ACK feedback for the communications based on the target error rate and on a result of the UE decoding the communications; and means for receiving, from the UE, a second ACK feedback for the communications based on the proxy ACK feedback configuration, where the second ACK feedback is associated with a proxy target error rate that is greater than the target error rate.

A non-transitory computer-readable medium storing code for wireless communications at a base station is described. The code may include instructions executable by a processor to transmit, to a UE, a proxy ACK feedback configuration for communications associated with a target error rate that is below a threshold target error rate; transmit, to the UE, the communications associated with the target error rate; receive, from the UE, first ACK feedback for the communications based on the target error rate and on a result of the UE decoding the communications; and receive, from the UE, a second ACK feedback for the communications based on the proxy ACK feedback configuration, where the second ACK feedback is associated with a proxy target error rate that is greater than the target error rate.

Some examples of the method, apparatuses, and non-transitory computer-readable medium described herein may further include operations, features, means, or instructions for updating outer loop power settings for the communications associated with the target error rate based on receiving the second ACK feedback and transmitting, to the UE, additional communications associated with the target error rate in accordance with the updated outer loop power settings.

Some examples of the method, apparatuses, and non-transitory computer-readable medium described herein may further include operations, features, means, or instructions for transmitting an indication that the UE is to determine the second ACK feedback based on a subset of LLRs to be used for the communications.

Some examples of the method, apparatuses, and non-transitory computer-readable medium described herein may further include operations, features, means, or instructions for transmitting, via the indication, a proxy down-sampling rate that is less than a down-sampling rate of the communications, where the subset of LLRs includes LLRs decoded in accordance with the proxy down-sampling rate or a random selection of LLRs.

Some examples of the method, apparatuses, and non-transitory computer-readable medium described herein may further include operations, features, means, or instructions for estimating a signal-to-noise (SNR) gap between the first ACK feedback and the second ACK feedback based on the proxy down-sampling rate and adjusting the proxy down-sampling rate to achieve the proxy target error rate based on a difference between a predetermined SNR gap between the proxy target error rate and the target error rate and the estimated SNR gap.

In some examples of the method, apparatuses, and non-transitory computer-readable medium described herein, transmitting the indication may include operations, features, means, or instructions for transmitting the indication as part of the proxy ACK feedback configuration via RRC signaling or as part of a DCI message.

Some examples of the method, apparatuses, and non-transitory computer-readable medium described herein may further include operations, features, means, or instructions for transmitting an indication that the UE is to determine the second ACK feedback based on an intermediate decoding of the communications.

Some examples of the method, apparatuses, and non-transitory computer-readable medium described herein may further include operations, features, means, or instructions for transmitting, via the indication, a number of decoding iterations to be used for the intermediate decoding, where the number of decoding iterations is less than a total number of decoding iterations to be used by the UE for decoding an entirety of the communications and is associated with the intermediate decoding.

In some examples of the method, apparatuses, and non-transitory computer-readable medium described herein, transmitting the indication may include operations, features, means, or instructions for transmitting the indication as part of the proxy ACK feedback configuration via RRC signaling or as part of a DCI message.

In some examples of the method, apparatuses, and non-transitory computer-readable medium described herein, the number of decoding iterations may correspond to the proxy target error rate that is greater than the first target error rate.

Some examples of the method, apparatuses, and non-transitory computer-readable medium described herein may further include operations, features, means, or instructions for receiving, from the UE, a multiplexed feedback message including the first ACK feedback and the second ACK feedback.

In some examples of the method, apparatuses, and non-transitory computer-readable medium described herein, the second ACK feedback may be received less frequently than the first ACK feedback.

In some examples of the method, apparatuses, and non-transitory computer-readable medium described herein, the communications associated with the target error rate that is below the threshold target error rate may include URLLC.

A method of wireless communications at a base station is described. The method may include transmitting, to a UE, a first wireless communication associated with a first target error rate; transmitting, to the UE, a second wireless communication associated with a second target error rate that is greater than the first target error rate; receiving ACK feedback for the second wireless communication, where the ACK feedback is based on successful reception of the second wireless communication in accordance with the second target error rate; and adjusting an outer-loop power parameter for the first wireless communication based on the ACK feedback for the second wireless communication.

An apparatus for wireless communications at a base station is described. The apparatus may include a processor, memory in electronic communication with the processor, and instructions stored in the memory. The instructions may be executable by the processor to cause the apparatus to transmit, to a UE, a first wireless communication associated with a first target error rate; transmit, to the UE, a second wireless communication associated with a second target error rate that is greater than the first target error rate; receive ACK feedback for the second wireless communication, where the ACK feedback is based on successful reception of the second wireless communication in accordance with the second target error rate; and adjust an outer-loop power parameter for the first wireless communication based on the ACK feedback for the second wireless communication.

Another apparatus for wireless communications at a base station is described. The apparatus may include means for transmitting, to a UE, a first wireless communication associated with a first target error rate; means for transmitting, to the UE, a second wireless communication associated with a second target error rate that is greater than the first target error rate; means for receiving ACK feedback for the second wireless communication, where the ACK feedback is based on successful reception of the second wireless communication in accordance with the second target error rate; and means for adjusting an outer-loop power parameter for the first wireless communication based on the ACK feedback for the second wireless communication.

A non-transitory computer-readable medium storing code for wireless communications at a base station is described. The code may include instructions executable by a processor to transmit, to a UE, a first wireless communication associated with a first target error rate; transmit, to the UE, a second wireless communication associated with a second target error rate that is greater than the first target error rate; receive ACK feedback for the second wireless communication, where the ACK feedback is based on successful reception of the second wireless communication in accordance with the second target error rate; and adjust an outer-loop power parameter for the first wireless communication based on the ACK feedback for the second wireless communication.

In some examples of the method, apparatuses, and non-transitory computer-readable medium described herein, adjusting the outer-loop power parameter further may include operations, features, means, or instructions for adjusting the first wireless communication based on an offset between a signal quality difference of the first target error rate and the second target error rate.

Some examples of the method, apparatuses, and non-transitory computer-readable medium described herein may further include operations, features, means, or instructions for selecting a predetermined value for the offset.

Some examples of the method, apparatuses, and non-transitory computer-readable medium described herein may further include operations, features, means, or instructions for receiving additional ACK feedback for unicast communications associated with the first wireless communications from one or more UEs and adapting the offset based on the additional ACK feedback, where the offset may be shared across the one or more UEs.

In some examples of the method, apparatuses, and non-transitory computer-readable medium described herein, the first wireless communication may include URLLC, and the second wireless communication may include eMBB traffic or dummy eMBB traffic.

In some examples of the method, apparatuses, and non-transitory computer-readable medium described herein, the first wireless communication may include URLLC, and the second wireless communication may include one or more broadcast channel transmissions with different radio network temporary identifiers (RNTIs).

Some examples of the method, apparatuses, and non-transitory computer-readable medium described herein may further include operations, features, means, or instructions for configuring a UE to monitor the one or more broadcast channel transmissions and to report ACK feedback for the one or more broadcast channel transmissions.

Some examples of the method, apparatuses, and non-transitory computer-readable medium described herein may further include operations, features, means, or instructions for adjusting an offset for outer-loop power control of the first wireless communication with the UE based on a known gap between the first target error rate and the second target error rate, where the second target error rate corresponds to a modulation and coding scheme (MCS) for the one or more broadcast transmissions.

DETAILED DESCRIPTION

Figure 1:
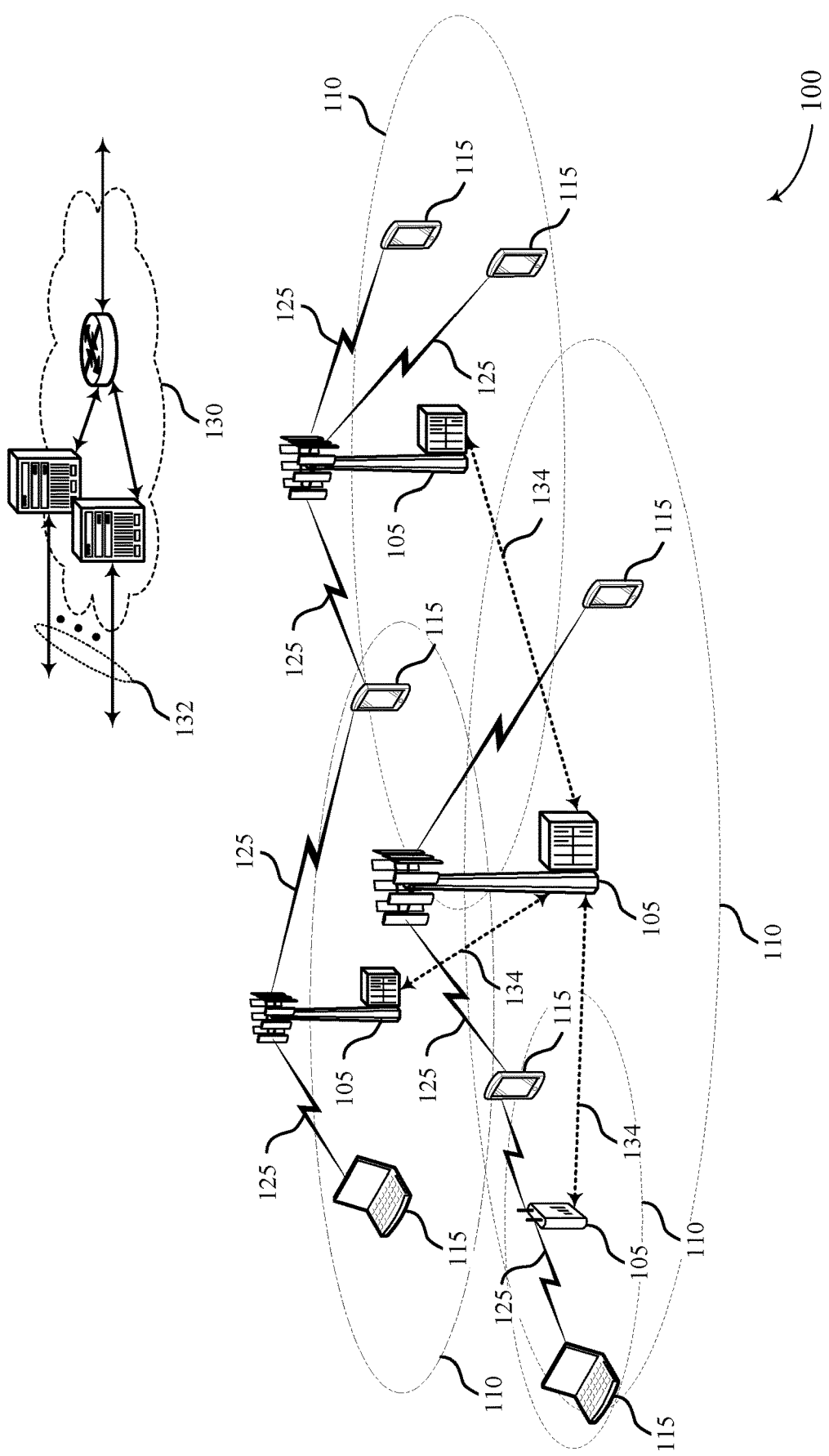
FIG. 1 illustrates an example of a system for wireless communications that supports outer-loop feedback support for low error rates in accordance with aspects of the present disclosure.

In some wireless communication systems (e.g., New Radio (NR)), one or more wireless devices may implement outer-loop feedback (e.g., outside loop link adaptation (OLLA)) to achieve appropriate transmission power settings (e.g., based on a modulation and coding scheme (MCS)). In some cases, the outer-loop feedback may enable a base station to adjust an average error rate (e.g., block error rate (BLER)) of its communications to reach a target error rate. In some services associated with the wireless communications system (e.g., mission critical functions, ultra-reliable low latency communications (URLLC)), a low BLER may be desired and/or required. For example, the resources for retransmissions in certain situations (e.g., for these services) may be limited and latency may be very stringent (e.g., based on not many chances for retransmission). As such, the base station may target a low error rate for such communications and may further use the outer-loop feedback to adjust an MCS and/or transmission power for the communications in order to reach the target BLER.

In some cases, the wireless communications system may receive feedback from wireless devices and use the feedback to drive the outer-loop feedback and make adjustments to reach the target BLER. Such feedback may be in the form of positive feedback (e.g., an acknowledgement (ACK) message) that acknowledges successfully received transmissions or negative feedback (e.g., a negative ACK (NACK) message) that indicates an error for received transmissions (e.g., the transmission was not received or decoded correctly). Accordingly, the NACK messages may enable step downs of a transmission parameter (e.g., power) for the outer-loop feedback by a set amount to achieve the target BLER. In some examples, if a device (e.g., a user equipment (UE)) receives data transmissions for communications associated with a low BLER, the device may, as a result, encounter only a small number of NACK samples to drive the outer-loop feedback. In some cases, the small number of NACK samples may prevent the outer-loop feedback from converging to the target BLER. Therefore, it may be beneficial to implement methods that can achieve outer-loop feedback convergence for communications preferring a low BLER.

As described herein, a wireless communications system may introduce additional outer-loop feedback support in the form of a proxy ACK/NACK feedback (e.g., traditional ACK/NACK feedback, soft ACK/NACK feedback, etc.) from a wireless device (e.g., a UE). In some instances, the proxy ACK/NACK feedback may be based on a subset or an intermediate decoding of the low-BLER transmissions, with the proxy ACK/NACK feedback associated with a higher BLER (e.g., and therefore generating more NACKs) than generated by the low BLER as discussed above. Additionally or alternatively, a wireless device may provide a second ACK/NACK feedback from additional transmissions received at the wireless device, where the transmissions may also target a higher BLER and generate more NACKs. For example, the second ACK/NACK feedback may be based on additional wireless communications (e.g. enhanced mobile broadband (eMBB) transmissions), dummy communications, or broadcast channel transmissions.

In the case of using the subset or the intermediate decoding of the low-BLER transmissions, a base station may indicate to the wireless device a specified subset of the communications to decode or a specified number of iterations for an intermediate decoding of the communications to perform. The subset/intermediate decoding may correlate the proxy feedback to the low-BLER transmissions. As such, the base station may then perform the outer-loop feedback based on the proxy feedback, with the correlation that when the proxy feedback reaches the specified BLER, the low-BLER communications may also reach the targeted low BLER. In the case of using a second communications (e.g., the additional communications, eMBB transmissions, dummy communications, or broadcast channel transmissions), the base station may request ACK/NACK feedback from a wireless device for the second communications. In this case, the additional ACK/NACK feedback may drive an outer-loop feedback for the second communications, which may determine a backoff (e.g., adjustment) for a parameter of the second communications (e.g., MCS, transmission power, etc.). Additionally, the base station may estimate an offset between the parameter backoff for the second communications and a backoff for the low-BLER transmissions, each at a respective desired BLER. As such, the base station may apply the backoff from the second communications adjusted by the estimated offset to drive the outer-loop feedback for the low-BLER transmissions to reach the target low BLER.

Aspects of the disclosure are initially described in the context of a wireless communications system. Additional wireless communications systems and feedback systems, a flowchart, and a process flow are then provided to illustrate aspects of the disclosure. Aspects of the disclosure are further illustrated by and described with reference to apparatus diagrams, system diagrams, and flowcharts that relate to outer-loop feedback support for targeting low error rates.

FIG. 1 illustrates an example of a wireless communications system 100 that supports outer-loop feedback support for low error rates in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications (e.g., URLLC), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions (e.g., URLLC).

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). A CRC may be an error-detecting code appended to a block of data to be transmitted. In some cases, the value of the CRC may be calculated from the block of data itself, and the length of the CRC may determine the number of errors which can be detected in the block of data on reception. In some instances, HARQ may utilize error detection, such as a CRC, to determine whether a block of data can be successfully decoded. Additionally or alternatively, a CRC can be used to compute other signal quality metrics (e.g., BLER). In some cases, a BLER may be calculated as the proportion of received data blocks which is decoded erroneously, where errors are detected by CRC failure. As such, a BLER may be used as a measure of received signal quality.

HARQ may improve throughput at the MAC layer in poor radio conditions (e.g., signal-to-noise conditions). In some cases, a wireless device may support same-slot HARQ feedback (e.g., ACK/NACK feedback), where the device may provide HARQ feedback in a specific slot for data received in a previous symbol in the slot. In other cases, the device may provide HARQ feedback in a subsequent slot, or according to some other time interval. In some examples, a transmitting device (e.g., base station 105, UE 115) may indicate a HARQ configuration to a receiving device (e.g., UE 115) using control signaling. Additionally, positive HARQ feedback (e.g., indicating a successfully-decoded block of data) may be referred to as an ACK, while negative HARQ feedback (e.g., HARQ feedback indicating an error in decoding the block of data) may be referred to as a NACK. As such, HARQ feedback may also be referred to as ACK/NACK feedback.

Additionally, a UE 115 in wireless communications system 100 may be configured to transmit channel quality information (CQI) information to a base station 105. In some cases, the UE 115 may report a CQI using a channel quality measurement (e.g., signal to noise ratio (SNR), signal to interference plus noise ratio (SINR)). In some instances, the UE 115 may also report the CQI as a function of frequency (e.g., for different channels). Additionally, CQI information may include information a base station 105 may use to determine appropriate configurations for communicating with a UE 115. For instance, a CQI from a UE 115 may include a CQI which a base station 105 may use to identify an MCS for a transmission to the UE 115. In some cases, the base station 105 may use CQIs to estimate the quality of channels available for communications with the UE 115, such that the base station may be able to identify appropriate resources for communicating with the UE 115. Thus, a base station 105 may use CQI information received from a UE 115 to determine appropriate configurations and appropriate resources for communications with the UE 115. Additionally, a UE 115 may transmit CQI information to a base station as a part of channel state information (CSI) transmissions. In some cases, CSI may also include additional information regarding channel characteristics and channel quality.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communication system 100 may implement an outer-loop feedback system (e.g., an OLLA algorithm) to select appropriate transmission parameters (e.g., MCS, transmission power, etc.) for current channel conditions. In some cases, the outer-loop feedback may be used to adaptively modify the transmission parameters to reach a target channel quality (e.g., as indicated by CSI, CQI, SNR, SINR, BLER, etc.). In some cases, a base station 105 may use the outer-loop feedback to adjust an average BLER to reach a target BLER, where the outer-loop feedback may be based on the targeted BLER. In some examples, if the actual BLER does not match the target BLER the OLLA may modify the transmission parameters by a certain amount (e.g., by a backoff) based on whether data packets have been received correctly or not. For instance, the outer-loop feedback may be driven by ACK/NACK feedback, in which a UE 115 may transmit ACK/NACK feedback to the base station 105 in response to data transmissions.

In cases where the actual BLER may not match the target BLER, if the base station 105 receives a NACK from the UE 115, the base station 105 may lower the transmission parameter by a specified number of decibels (e.g., 1 dB, 2 dB, 3 dB). Additionally or alternatively, if the actual BLER does not match the target BLER and the base station 105 receives an ACK from the UE 115, the base station 105 may raise the transmission parameter by a specified number of decibels (e.g., 0.001 dB, 0.002 dB, 0.003 dB). In some cases, the amount that the base station 105 raises the transmission parameter for an ACK may correspond to the amount that the base station 105 lowers the transmission parameter for a NACK. For example, if a 0.1% BLER is targeted for the communications and the base station 105 lowers the transmission parameter by a configured X dB (e.g., 1 dB, 2 dB, 3 dB) when a NACK is received, the base station 105 may raise the transmission parameter by 0.001*X dB (e.g., 0.001 dB, 0.002 dB, 0.003 dB) when an ACK is received, where 0.001 may be a multiplier derived from the targeted 0.1% target BLER.

In some services supported by wireless communications system 100 (e.g., mission critical functions, URLLC), a low BLER may be desired and/or required (e.g., 0.1% or 0.01% BLER). For example, the resources for retransmission in certain situations may be limited and latency may be very stringent (e.g., because there are not many chances for retransmission). As such, wireless communications system 100 may target the low BLER for these communications and may further use outer-loop feedback to adjust transmission parameters of the communications to reach the targeted low BLER. Because the low BLER is desired, the BLER for the communications may initially be set to a low value (e.g., 0.1%). However, if a UE 115 receives data on a channel with a low BLER, the UE 115 may, as a result, encounter only a small number of NACK samples to drive the outer-loop feedback. In some cases, the small number of NACK samples may prevent the outer-loop feedback from converging to the target BLER. For example, with an initial BLER of 0.1%, every 1000 transmissions will, on average, result in one NACK (e.g., (1000 transmissions)×(0.1% BLER)=1 NACK), which may provide insufficient feedback to drive the outer-loop feedback to converge. Therefore, it may be beneficial to implement methods that can achieve the outer-loop feedback convergence for communications preferring a low BLER.

Wireless communications system 100 may support techniques for implementing outer-loop feedback for targeting a low BLER for corresponding communications, such as introducing additional outer-loop feedback support in the form of a proxy ACK/NACK feedback (e.g., traditional HARQ ACK/NACK feedback, soft ACK/NACK feedback, etc.) from a UE 115 to a base station 105, where the proxy ACK/NACK feedback may be associated with a higher BLER and generate more NACK instances to drive the outer-loop feedback for the communications. In some instances, the proxy ACK/NACK feedback may be based on a subset decoding or an intermediate decoding of the communications, which may target the higher BLER (e.g., and therefore generate more NACKs). Additionally or alternatively, the UE 115 may provide ACK/NACK feedback from additional transmissions received from the base station 105, where the additional transmissions may also target a higher BLER and generate more NACKs. This ACK/NACK feedback may be used to drive one or more outer-loop feedbacks, which may help the base station 105 adjust parameters for the communications that may allow the base station 105 to reach the targeted low BLER.

Figure 2:
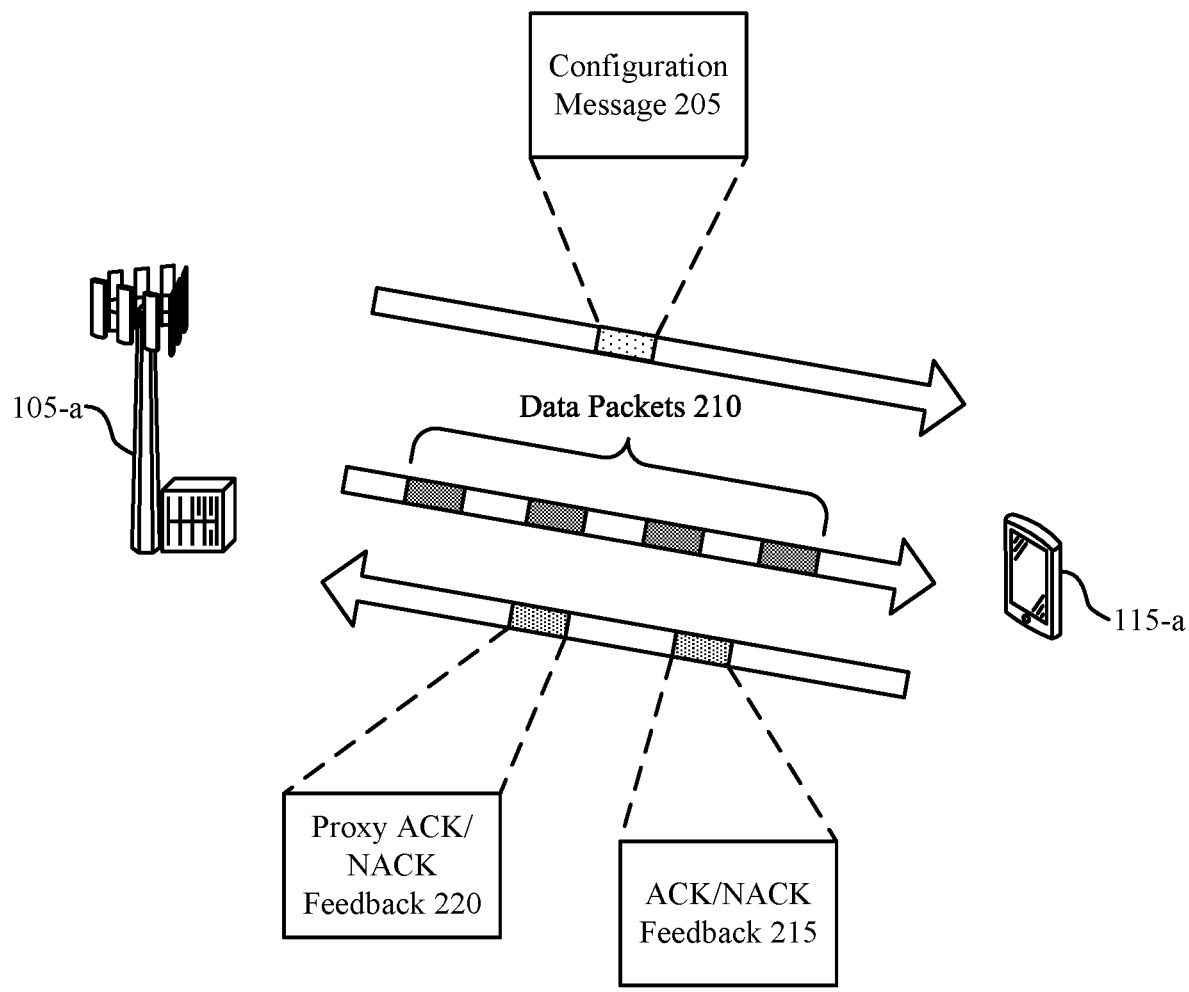
FIGS. 2 and 3 illustrate examples of feedback systems that support outer-loop feedback support for low error rates in accordance with aspects of the present disclosure.

FIG. 2 illustrates an example of a feedback system 200 that supports outer-loop feedback support for low error rates in accordance with aspects of the present disclosure. In some examples, feedback system 200 may implement aspects of wireless communications system 100. Feedback system 200 may include a UE 115-*a* and a base station 105-*a*, which may be examples of a UE 115 and a base station 105, respectively, as described with reference to FIG. 1. In some instances, UE 115-*a* and base station 105-*a* may communicate using ultra-reliable communications (e.g., mission-critical communications, URLLC).

In some cases, a low BLER (e.g., error rate) may be desired for communications between UE 115-*a* and base station 105-*a*. As such, the low BLER target may result in insufficient NACK feedback to correctly drive an outer-loop feedback to set appropriate transmission parameters for the communications between UE 115-*a* and base station 105-*a* (e.g., to achieve the desired low BLER). As such, base station 105-*a* may configure UE 115-*a* to transmit additional outer-loop feedback support in the form of a proxy ACK/NACK feedback (e.g., traditional HARQ ACK/NACK feedback, soft ACK/NACK feedback, etc.).

For example, base station 105-*a* may configure UE 115-*a* to feedback not only ACK/NACK bits corresponding to the targeted low BLER (e.g., 0.1%), but also proxy ACK/NACK bits corresponding to a higher BLER (e.g., 10%). In some cases, the ACK/NACK feedback for the higher BLER may help the outer-loop feedback converge to the higher BLER. For example, the higher BLER may be mapped to the targeted low BLER, which may ensure that as the outer-loop feedback converges to the higher BLER using the proxy ACK/NACK feedback, the low-error communications may similarly converge to the targeted low BLER. Base station 105-a may send a configuration message 205 to UE 115-a to indicate a configuration for the proxy ACK/NACK feedback. In some cases, configuration message 205 may be sent using downlink control information (DCI) or RRC. After transmitting configuration message 205, base station 105-a may transmit one or more data packets 210 to UE 115-a. Based on configuration message 205 and data packets 210, UE 115-a may transmit a normal ACK/NACK feedback 215 based on attempting to decode the entire low-error communications (e.g., all data packets 210) and a proxy ACK/NACK feedback 220 based on the proxy ACK/NACK feedback configuration received in configuration message 205.

The proxy ACK/NACK feedback 220 may include traditional HARQ ACK/NACK feedback, where one bit is transmitted by UE 115-a to indicate whether a downlink transmission (e.g., the one or more data packets 210) is successfully received and decoded (e.g., an ACK) or is unsuccessfully received or decoded (e.g., a NACK). Additionally or alternatively, the proxy ACK/NACK feedback 220 may include a soft ACK/NACK feedback, where UE 115-a transmits multiple bits (e.g., three (3) bits) to indicate how strong decoded LLRs were for the downlink transmission. For example, if UE 115-a transmits '111' for the soft ACK/NACK feedback, base station 105-a may determine that the downlink transmission sent to UE 115-a was in good condition (e.g., the transmission had a good SNR). Alternatively, if UE 115-a transmits a '001' for the soft ACK/NACK feedback, base station 105-a may determine that UE 115-a successfully received and decoded the downlink transmission but that the downlink transmission was close to failure. As such, base station 105-a may adjust one or more parameters to improve conditions for subsequent downlink transmissions (e.g., improve SNR, increase transmission power, etc.) based on the downlink transmission being close to failure from the soft ACK/NACK feedback (e.g., the '001' transmitted by UE 115-a).

In some cases, a higher BLER may be obtained by partially decoding data packets 210. Accordingly, base station 105-a may configure UE 115-a to report ACK/NACK feedback for the partial decoding (e.g., through configuration message 205). For example, the partial decoding may be achieved by performing the decoding with a selected subset of bits received by UE 115-a (e.g., a portion of data packets 210). In some cases, the partial decoding may be accomplished by using a subset of LLRs corresponding to the subset of bits. For example, UE 115-a may receive 3000 bits, decode 10% of the bits for the partial decoding (e.g., based on configuration message 205), and may then send ACK/NACK feedback for the 10% of the bits used for the partial decoding (e.g., via proxy ACK/NACK feedback 220). In some cases, the de-rate-matching process of the partial decoding may mimic a higher MCS (e.g., artificially increase BLER) because some bits may be intentionally ignored.

In some instances, the subset of bits (e.g., subset of corresponding LLRs) may be randomly picked by base station 105-a and indicated in configuration message 205 to UE 115-a. Additionally or alternatively, the subset of bits may be uniformly down-sampled by UE 115-a based on a specified down-sampling rate as indicated in configuration message 205. For example, base station 105-a may configure the down-sampling rate to control the behavior of the proxy ACK/NACK feedback 220 based on the targeted low BLER. In some cases, the partial decoding ACK/NACK configuration may be assistant information multiplexed with a standard ACK/NACK codebook. Additionally or alternatively, the partial decoding ACK/NACK configuration may be configured for all standard ACK/NACK or for a subset of standard ACK/NACK (e.g., to reduce overhead).

In some cases, UE 115-a may report the proxy ACK/NACK feedback 220 (e.g., based on the partial decoding) to base station 105-a in addition to the normal ACK/NACK feedback 215. In some examples, base station 105-a may then use the proxy ACK/NACK feedback 220 to drive the outer-loop feedback backoff, which may include controlling the outer-loop feedback to the higher BLER (e.g., 10%) based on the partial decoding. Additionally, base station 105-a may map the higher BLER to the targeted lower BLER by estimating an SNR gap between full decoding and partial decoding. In some cases, if base station 105-a knows what the SNR gap should be between the higher BLER (e.g., 10%) and lower BLER (e.g., 0.1%), base station 105-a may be able to control the down-sampling rate to achieve the required SNR gap between the lower targeted BLER and the higher BLER based on the partial decoding. As such, base station 105-a may then control the BLER from the partial decoding to the higher BLER (e.g., 10%) using the outer-loop feedback and may assume that the targeted low BLER (e.g., belonging to the data packets 210) correspondingly drops to the appropriate target (e.g., 0.1%). Additionally, using the outer-loop feedback to control to a higher BLER may speed outer-loop feedback convergence rates since the amount of NACK instances may be higher. For example, a 10% BLER rate may result in proxy NACKs for every 100 out of 1000 data packets, while a 0.1% BLER rate may result in actual NACKs for every 1 out of 1000 data packets.

Additionally, the partial decoding may use an additional round of decoding with the subset of bits (e.g., the LLRs corresponding the subset of bits). In some situations, the additional round of decoding may not affect system performance if the additional round of decoding is within the envelope of capability for UE 115-a. Additionally, UE 115-a may be configured by base station 105-a to report partially decoded ACK/NACK (e.g. proxy ACK/NACK) less frequently than normal ACK/NACK. For example, base station 105-a may configure UE 115-a to report one proxy ACK/NACK instance for every ten normal ACK/NACK instances.

In another example of proxy ACK/NACK feedback using a higher BLER, UE 115-a may decode data packets 210 with less iterations than decoding the entirety of data packets 210. For example, UE 115-a may report proxy ACK/NACK feedback 220 based on an intermediate decoding, in addition to reporting the normal ACK/NACK feedback 215 (e.g., standard ACK/NACK feedback, default ACK/NACK feedback, etc.). In one example, UE 115-a may report proxy ACK/NACK feedback after three iterations of decoding, as opposed to after ten iterations for the standard ACK/NACK. In the case of using less iterations, base station 105-a may configure UE 115-a (e.g., via configuration message 205) to report proxy ACK/NACK feedback 220 (e.g., an additional ACK/NACK feedback) based on an intermediate decoding. Since UE 115-a may report its feedback before finishing decoding completely, the proxy data may mimic a higher MCS (e.g., artificially increase BLER). In some instances, base station 105-a may configure the number of iterations to control the behavior of the resultant proxy MCS and/or BLER. In some cases, the amount of intermediate decoding for the proxy ACK/NACK configuration may be assistant information multiplexed with a standard ACK/NACK codebook. Additionally or alternatively, the amount of intermediate decoding for the proxy ACK/NACK configuration may be configured for all standard ACK/NACK or for a subset of standard ACK/NACK (e.g., to reduce overhead). Base station 105-a may use the proxy ACK/NACK feedback 220 from the intermediate decoding in a similar manner as the partial decoding as described above to drive the outer-loop feedback to achieve the targeted lower BLER.

In some cases, the method of using intermediate decoding may result in the same amount of decoding for typical ACK/NACK feedback (e.g., no additional decoding). For example, UE 115-a may report an intermediate ACK/NACK result from the decoding process (e.g., ACK/NACK results after a specified number of iterations), without having to decode data packets 210 multiple times. Additionally, UE 115-a may be configured by base station 105-a to report intermediately-decoded ACK/NACK (e.g. proxy ACK/NACK feedback 220) less frequently than the normal ACK/NACK feedback 215. For example, base station 105-a may configure UE 115-a to report one proxy ACK/NACK instance for every ten actual ACK/NACK instances. Based on the proxy ACK/NACK feedback 220 from the partial decoding and/or the reduced number of iterations for the intermediate decoding, the targeted low BLER may be achieved more efficiently than using only the normal ACK/NACK feedback for outer-loop feedback.

Figure 3:
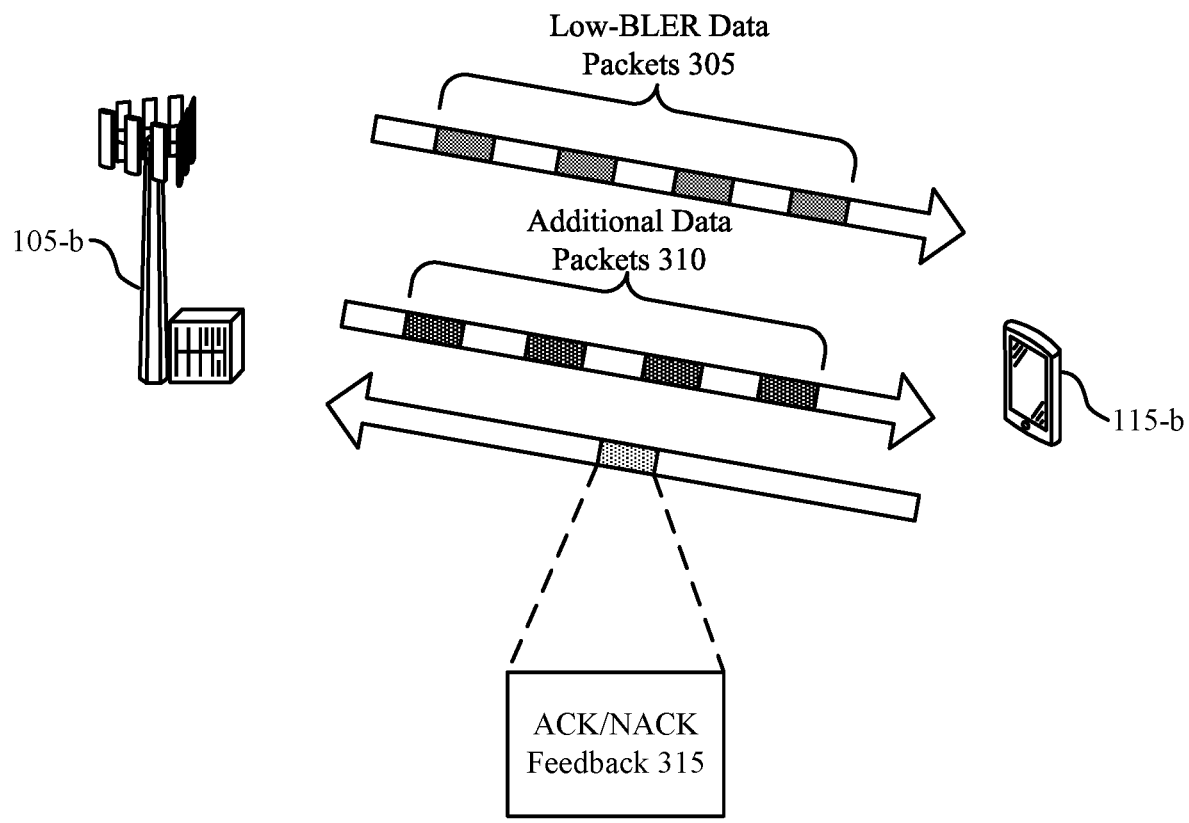

FIG. 3 illustrates an example of a feedback system 300 that supports outer-loop feedback support for low error rates in accordance with aspects of the present disclosure. In some examples, feedback system 300 may implement aspects of wireless communications system 100 and/or feedback system 200. Feedback system 300 may include a UE 115-b and a base station 105-b, which may be examples of a UE 115 and a base station 105, respectively, as described with reference to FIGS. 1 and 2. In some instances, UE 115-b and base station 105-b may communicate using ultra-reliable communications (e.g., mission-critical communications, URLLC).

In some cases, a low error rate (e.g., BLER) may be desired for communications between UE 115-b and base station 105-b. In some examples, a low BLER target may result in insufficient NACK feedback to correctly drive the outer-loop feedback to set an appropriate MCS (e.g., to achieve the desired BLER). As such, feedback system 300 may use a different wireless communication with a different BLER target to drive the outer-loop feedback.

For example, base station 105-b may transmit additional wireless communications (e.g., eMBB traffic) with a higher BLER (e.g., 10%) to UE 115-b and request ACK/NACK feedback (e.g., bits) corresponding to the additional communications. In some cases, base station 105-b may maintain an outer-loop feedback for the additional communications and may base the outer-loop feedback for the low-error communications on the outer-loop feedback for the additional communications. For example, base station 105-b may send one or more low-BLER data packets 305 to UE 115-b. Additionally, base station 105-b may transmit one or more additional data packets 310 for other communication types (e.g., eMBB) to UE 115-b. As a part of receiving both transmissions, UE 115-b may transmit ACK/NACK feedback 315 (e.g., traditional HARQ ACK/NACK feedback, soft ACK/NACK feedback, etc.) to base station 105-b, based on its decoding of the additional data packets 310. Upon receiving the ACK/NACK feedback 315, base station 105-b may drive the outer-loop feedback for the higher-error communications with the corresponding feedback. Furthermore, base station 105-b may also introduce a backoff plus an offset (e.g., based on the higher-BLER outer-loop feedback) to the outer-loop feedback for the low-BLER communications.

For example, base station 105-b may transmit both URLLC (e.g., low-BLER data packets 305) and eMBB (e.g., additional data packets 310) communications to UE 115-b. In some cases, the eMBB packets may target a higher BLER (e.g., 10%) than the BLER for the URLLC packets (e.g., 0.1%). After receiving and decoding both communication streams, UE 115-b may transmit ACK/NACK feedback 315 for the eMBB communications. Base station 105-b may then use the eMBB ACK/NACK data in ACK/NACK feedback 315 to run the outer-loop feedback for the eMBB communications. Upon running the outer-loop feedback for eMBB, base station 105-b may determine that a certain backoff (B1) is needed for the eMBB transmissions and associated higher BLER. Further, base station 105-b may determine an offset (O) between the eMBB backoff and a URLLC backoff and apply the sum of the eMBB backoff and the offset (e.g., B1+O) to an outer-loop feedback for the URLLC. In some cases, base station 105-b may use scheduler implementation to accomplish this ACK/NACK feedback scheme, without requiring any additional calculations or input from UE 115-b (e.g., UE 115-b may not need to know any additional information beyond the need to report ACK/NACK feedback on the received data streams).

In some examples, the offset may be estimated by the distance between the points of the high BLER and low BLER on the SINR prediction error distribution. In other instances, the offset may be a predetermined value (e.g., a fixed value determined from an offline study). In some cases, as a result of using a fixed value for the offset, the URLLC outer-loop feedback may become half open-loop and half closed-loop and the target BLER may not reach the exact value. Additionally or alternatively, the offset may be an adapting offset that uses ACK/NACK feedback for the low-BLER communications (e.g., URLLC) from UE 115-b. In other examples, the offset may be an adapting offset that uses ACK/NACK feedback for the low-BLER communications from multiple UEs 115 (e.g., based on unicast URLLC communications between each of the multiple UEs 115 and base station 105-b) that may share the same offset, which may assume that the per-UE offset will drive the channel adaptation.

In some cases, UE 115-b may not be scheduled to receive additional communications (e.g., eMBB traffic) from base station 105-b. As such, base station 105-b may transmit a dummy traffic (e.g., dummy eMBB traffic) to UE 115-b, which may include fake data that UE 115-b may eventually discard. For example, base station 105-b may transmit both low-error communications (e.g., low-BLER data packets 305) and dummy communications (e.g., additional data packets 310) with a higher BLER to UE 115-b. Since the additional data packets 310 may now include data that will eventually be discarded, this method may increase resource use and signaling overhead. After transmitting the dummy data blocks, the process of using the additional traffic to drive the low-BLER outer-loop feedback may follow the same steps outlined above for the additional communications.

Additionally or alternatively, base station 105-b may introduce a broadcast channel transmission if UE 115-b is not scheduled for additional communications. In some cases, base station 105-b may transmit multiple broadcasts, each with a different MCS and with a different radio network temporary identifier (RNTI). In some examples, because the broadcast may not carry any ACK resource indicator (ARI)

information in the grant, UE 115-*b* may be configured (e.g., via RRC or DCI) to monitor one or more such broadcast channels (e.g., with different MCSs) and report ACK/NACK feedback to base station 105-*b*. Additionally, base station 105-*b* may collect feedback from UE 115-*b* for each channel to see how the ACK/NACK ratio corresponds to the channel MCS (e.g., since broadcast may not be MCS or rate-controlled). For example, base station 105-*b* may gather and analyze information to conclude that, at a certain MCS, UE 115-*b* will receive data at a certain BLER (e.g., 10%). Furthermore, if the gap between the broadcast BLER and the low, targeted BLER is known, base station 105-*b* may apply the offset to drive the low-BLER outer-loop feedback as described above. In some instances, the broadcast channel scheme may result in an extra broadcast transmission (e.g., physical downlink shared channel (PDSCH)) for base station 105-*b* and an extra ACK/NACK report by UE 115-*b*. Since the broadcast channel may be shared by multiple UEs, the system overhead may be smaller when compared to the non-broadcast dummy transmissions described above.

Figure 4:
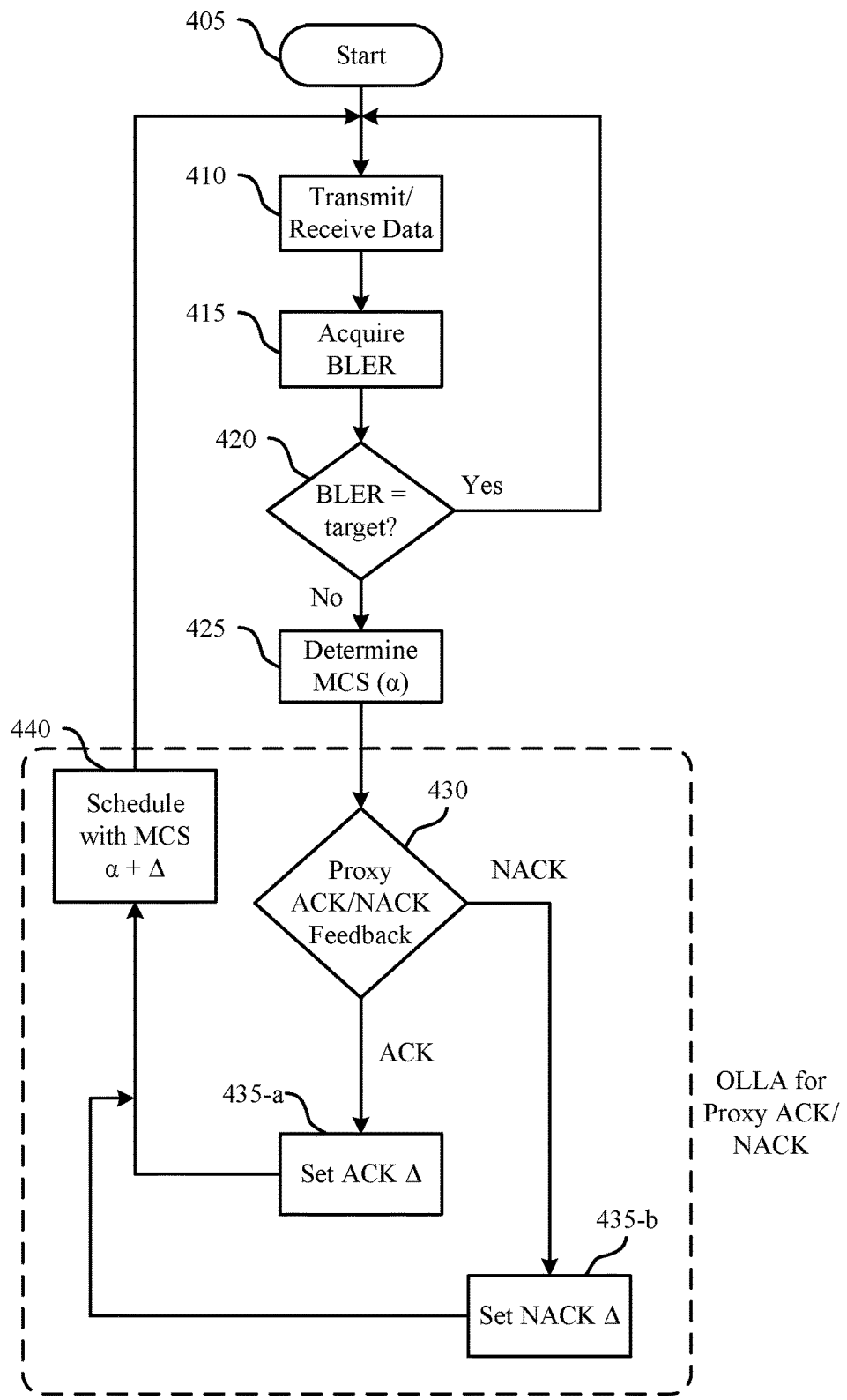
FIG. 4 illustrates an example of a flowchart that supports outer-loop feedback support for low error rates in accordance with aspects of the present disclosure.

FIG. 4 illustrates an example of a flowchart 400 that supports outer-loop feedback support for low error rates in accordance with aspects of the present disclosure. In some examples, flowchart 400 may implement aspects of wireless communications system 100 and/or feedback systems 200 and 300. Flowchart 400 illustrates base station 105 and UE 115 behavior while performing outer-loop feedback, where the base station 105 and UE 115 may be examples of a base station 105 and a UE 115, as described with reference to FIGS. 1-3. In some cases, the outer-loop feedback may be an OLLA scheme implemented by the base station 105 for adjusting transmission parameters to achieve a low BLER for communications in the system. As described herein, the base station 105 may use a combination of proxy ACK/NACK feedback (e.g., traditional HARQ ACK/ANCK feedback, soft ACK/NACK feedback, etc.) and normal ACK/NACK feedback to drive the OLLA scheme for achieving the low BLER.

At 405, a base station 105 may begin the OLLA process for communications with a low targeted error rate (e.g., low BLER) by signaling a UE 115 to begin communications.

At 410, the base station 105 may transmit data (e.g., URLLC data packets) to the UE 115 and/or receive data (e.g., ACK/NACK feedback, CSI) from the UE 115. In some instances, the base station 105 may receive CSI that may include CQI data that may be used to determine a BLER for the transmissions.

At 415, the base station 105 may acquire the current BLER for the low-error (e.g., URLLC) communications. In some cases, acquiring the current BLER may include gathering information from the UE 115 and/or calculating a BLER based on information already received from the UE 115.

At 420, the base station 105 may compare the current BLER with the targeted BLER for the low-error communications. In some cases, if the current and targeted BLER are not equal, the base station 105 may continue with the OLLA process at 425. In other cases, if the current and targeted BLER are equal, the base station 105 may return to transmitting and receiving at 410, using the same MCS and/or other transmission parameters. In some cases, the base station 105 may determine that the current and targeted BLER are equal if the two values are within a certain margin of error.

At 425, if the base station 105 has determined that the current BLER is not equal to the target, the base station 105 may further determine the current MCS (e.g., a) used in the low-BLER communications with the UE 115.

At 430, the base station 105 may review the most recent proxy ACK/NACK feedback from the UE 115. In some cases, the proxy ACK/NACK feedback may be based on proxy ACK/NACKs from low-error communications or based on proxy ACK/NACKs from additional communications, as described above with reference to FIGS. 2 and 3. Additionally, the proxy ACK/NACKs may include traditional HARQ ACK/NACK feedback (e.g., one bit ACK feedback), soft ACK/NACK feedback (e.g., multiple bits to represent the strength of a decoded transmission), or a different ACK/NACK feedback configuration. In some instances, the base station 105 may determine that the most recent feedback contained an ACK (e.g., with a represented strength of the ACK with the soft ACK/NACK feedback), in which case the base station 105 may proceed to 435-*a*. In other cases, the base station 105 may determine that the most recent feedback was a NACK, in which case the base station 105 may proceed to 435-*b*. In some examples, the feedback loop in flowchart 400 may be completed and return to step 410 in the same amount of time it may take to receive a new ACK/NACK feedback from the UE 115. As such, the base station 105 may have the chance to perform OLLA based on each new ACK/NACK response.

At 435, the base station 105 may set a backoff or adjustment (e.g., A) for the MCS pertaining to its low-BLER communications with the UE 115. In some cases, as shown at 435-*a*, the base station 105 may detect an ACK and set a positive backoff to its MCS (e.g., 0.001 dB, 0.002 dB, 0.003 dB). In other cases, as shown at 435-*b*, the base station 105 may detect a NACK and set a negative backoff (e.g., decrease, step down) to its MCS (e.g., −1 dB, −2 dB, −3 dB). In some cases, the backoff for an ACK may be a percentage of the backoff for a NACK (e.g., where the percentage may be based on the BLER target). For example, a NACK may result in a backoff which decreases the MCS by X dB (e.g., 1 dB, 2 dB, 3 dB), and an ACK may result in a backoff which increases the MCS by 0.001*X dB (e.g., 0.001 dB, 0.002 dB, 0.003 dB), where 0.001 may be a multiplier based on the target BLER (e.g., 0.1%). Additionally or alternatively, the backoff may be calculated by taking a similar backoff from a higher-BLER communication and adding it to a calculated offset, as described above with reference to FIG. 3.

At 440, the base station 105 may schedule its upcoming transmissions with a new MCS (e.g., α+Δ) based on the backoff value determined at 435. In some cases, the base station 105 may increase or decrease its current MCS by the determined backoff value to create the new MCS value. Additionally, the base station 105 may return to 410 and transmit and/or receive data using the new MCS, thus beginning the OLLA process again for a new round of transmissions and feedback.

Figure 5:
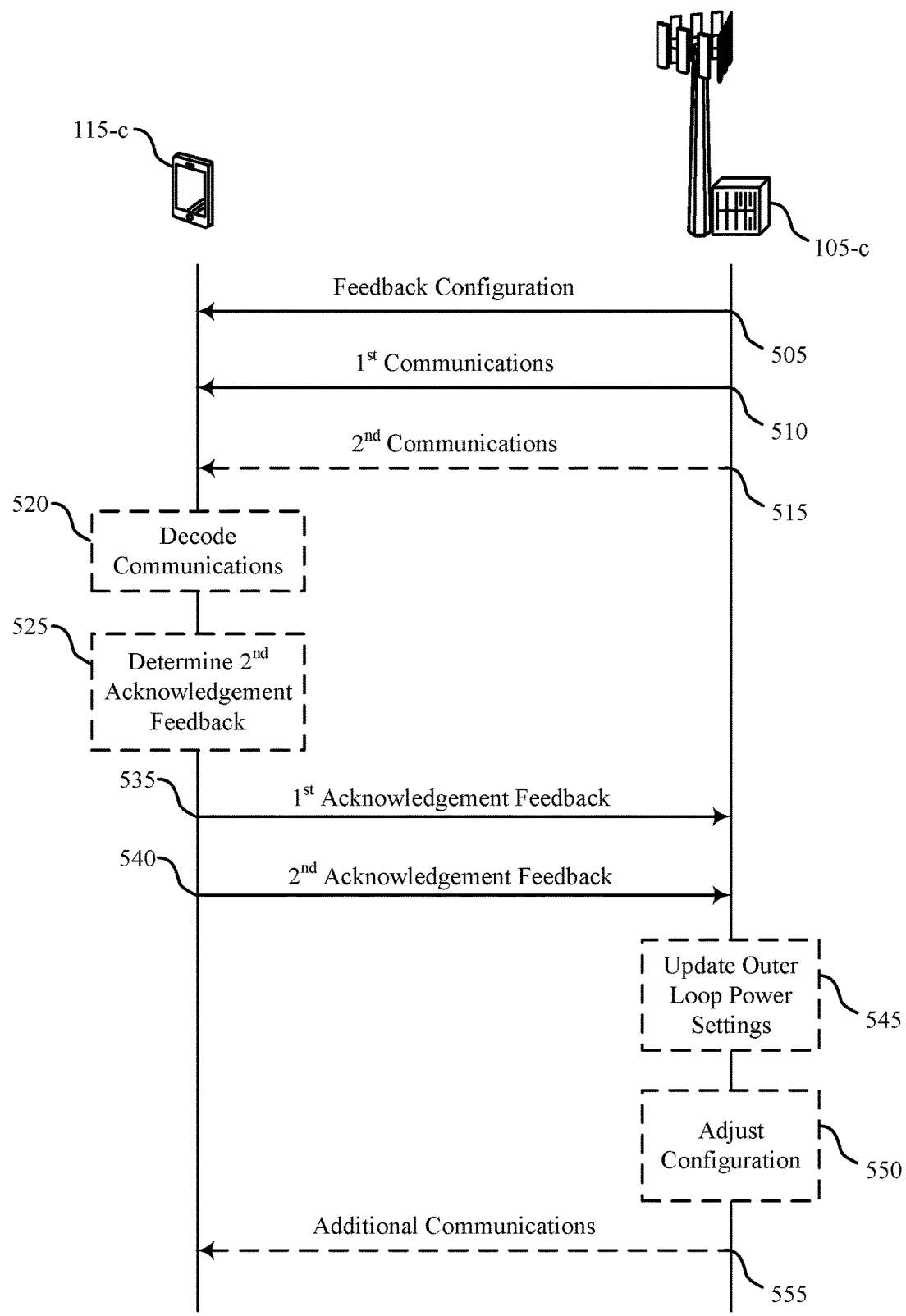
FIG. 5 illustrates an example of a process flow that supports outer-loop feedback support for low error rates in accordance with aspects of the present disclosure.

FIG. 5 illustrates an example of a process flow 500 that supports outer-loop feedback support for low error rates in accordance with aspects of the present disclosure. In some examples, process flow 500 may implement aspects of wireless communications system 100 and/or feedback systems 200 and 300. Additionally, process flow 500 may implement aspects of flowchart 400. Further, process flow 500 may include a UE 115-*c* and a base station 105-*c*, which may be examples of a UE 115 and a base station 105, respectively, as described with reference to FIGS. 1-4.

In the following description of the process flow 500, the operations between the UE 115-*c* and base station 105-*c* may be transmitted in a different order than the exemplary order shown, or the operations performed by base station 105-*c* and UE 115-*c* may be performed in different orders or at different times. Certain operations may also be left out of the process flow 500, or other operations may be added to the process flow 500. It is to be understood that while base station 105-*c* and UE 115-*c* are shown performing a number of the operations of process flow 500, any wireless device may perform the operations shown.

At 505, base station 105-*c* may transmit, and UE 115-*c* may receive, a proxy ACK feedback configuration for communications (e.g., mission critical communications, URLLC) associated with a target error rate (e.g., first target error rate) that is below a threshold target error rate (e.g., a low target error rate, a BLER less than 1%). Additionally, the proxy ACK feedback configuration may include a traditional ACK/NACK feedback from UE 115-*c*, a soft ACK/NACK feedback from UE 115-*c*, or a different ACK/NACK feedback configuration for UE 115-*c* to send feedback to base station 105-*c*.

In some cases, the feedback configuration may include an indication that UE 115-*c* is to determine a second ACK feedback based on a subset of LLRs to be used for the communications. Additionally, the indication may include a proxy down-sampling rate that is less than a down-sampling rate of the communications, where the subset of LLRs may include LLRs decoded in accordance with the proxy down-sampling rate or a random selection of LLRs. In some instances, the indication may be part of the proxy ACK feedback configuration transmitted via RRC signaling or as part of a DCI message.

In other cases, the feedback configuration may include an indication that UE 115-*c* is to determine the second ACK feedback based on an intermediate decoding of the communications. Additionally, the indication may include a number of decoding iterations to be used for the intermediate decoding, where the number of decoding iterations may be less than a total number of decoding iterations to be used by UE 115-*c* for decoding an entirety of the first communications and where the number of decoding iterations may be associated with the intermediate decoding. In some cases, the number of decoding iterations may correspond to a proxy target error rate that is greater than the target error rate. Additionally, the indication may be part of the proxy ACK feedback configuration sent via RRC signaling or as part of a DCI message.

At 510, base station 105-*c* may transmit, and UE 115-*c* may receive, the communications associated with the target error rate (e.g., first communications, low-error communications, etc.). In some instances, the communications associated with the target error rate (e.g., first target error rate) below the threshold target error rate may include URLLC.

At 515, base station 105-*c* may transmit, and UE 115-*c* may receive, a second wireless communication with a second target error rate that is greater than the first target error rate. In some instances, the second wireless communication may include eMBB traffic or dummy eMBB traffic. Additionally, the second wireless communication may include one or more broadcast channel transmissions with different RNTIs, and base station 105-*c* may configure UE 115-*c* to monitor the one or more broadcast channel transmissions and to report ACK feedback for the one or more broadcast channel transmissions.

At 520, UE 115-*c* may decode the first and/or second communications according to the proxy ACK feedback configuration received at 505. In some instances, decoding the communications may include decoding the communications according to the proxy down-sampling rate, where UE 115-*c* may decode a subset of LLRs that may include LLRs decoded in accordance with the proxy down-sampling rate. Additionally or alternatively, decoding the communications may include decoding a random selection of LLRs of the communications, where the subset of LLRs includes the random selection of LLRs. In other instances, decoding the communications may include decoding the communications according to the number of decoding iterations.

At 525, UE 115-*c* may determine a second ACK feedback based on the decoding, in accordance with the proxy ACK feedback configuration received at 505. In some cases, determining the second ACK feedback may be based on decoding in accordance with the proxy down-sampling rate. Additionally or alternatively, determining the second ACK feedback may be based on the decoding of the random selection of LLRs. In other cases, determining the second ACK feedback may be based on the decoding by the number of decoding iterations.

At 535, UE 115-*c* may transmit, and base station 105-*c* may receive, a first ACK feedback for the first communications (e.g., low-BLER communications) based on the target error rate and on decoding the communications.

At 540, UE 115-*c* may transmit, and base station 105-*c* may receive, a second ACK feedback for the first communications based on the proxy ACK feedback configuration, where the second ACK feedback is associated with a proxy target error rate that is greater than the target error rate. In some cases, the UE 115-*c* may multiplex the first ACK feedback with the second ACK feedback. Additionally or alternatively, the second ACK feedback may be transmitted and received less frequently than the first ACK feedback.

In other cases, UE 115-*c* may transmit, and base station 105-*c* may receive, a second ACK feedback for the second wireless communications based on successful reception of the second wireless communication in accordance with the second target error rate.

At 545, base station 105-*c* may update outer loop power settings (e.g., via OLLA) for the communications associated with the target error rate, based on receiving the second ACK feedback. In some cases, adjusting the outer loop power parameter for the first wireless communications may be based on the ACK feedback for the second wireless communication. Additionally, adjusting the outer loop power parameter may further include adjusting the first wireless communication with UE 115-*c* based on an offset between a signal quality difference of the first target error rate (e.g., for the first communications) and the second target error rate (e.g., for the second communications). In some cases, the offset may be determined by selecting a predetermined value (e.g., a fixed value for the offset based on an offline study). In some examples, determining the offset may include receiving additional ACK feedback for unicast communications associated with the first wireless communications from one or more UEs 115 and adapting the offset based on the additional ACK feedback, where the offset may be shared across the one or more UEs 115. Additionally, adjusting the offset may be based on a known gap between the first target error rate and the second target error rate, where the second target error rate may correspond to an MCS for the one or more broadcast transmissions.

At 550, base station 105-*c* may adjust the proxy ACK feedback configuration. In some examples, adjusting the configuration may include estimating an SNR gap between the first ACK feedback and the second ACK feedback. In some cases, estimating the SNR gap may be based on the proxy down-sampling rate and adjusting the proxy down-sampling rate to achieve the proxy target error rate based on a difference between a predetermined SNR gap between the proxy target error rate and the target error rate and the estimated SNR gap.

At 555, base station 105-*c* may transmit, and UE 115-*c* may receive, additional communications associated with the target error rate in accordance with the updated outer loop power settings. In some instances, the additional communications may include examples of the first communications, the second communications, or a combination thereof. Additionally, the additional communications may include any necessary configuration signaling needed to carry out possible changes to the feedback configuration.

Figure 6:
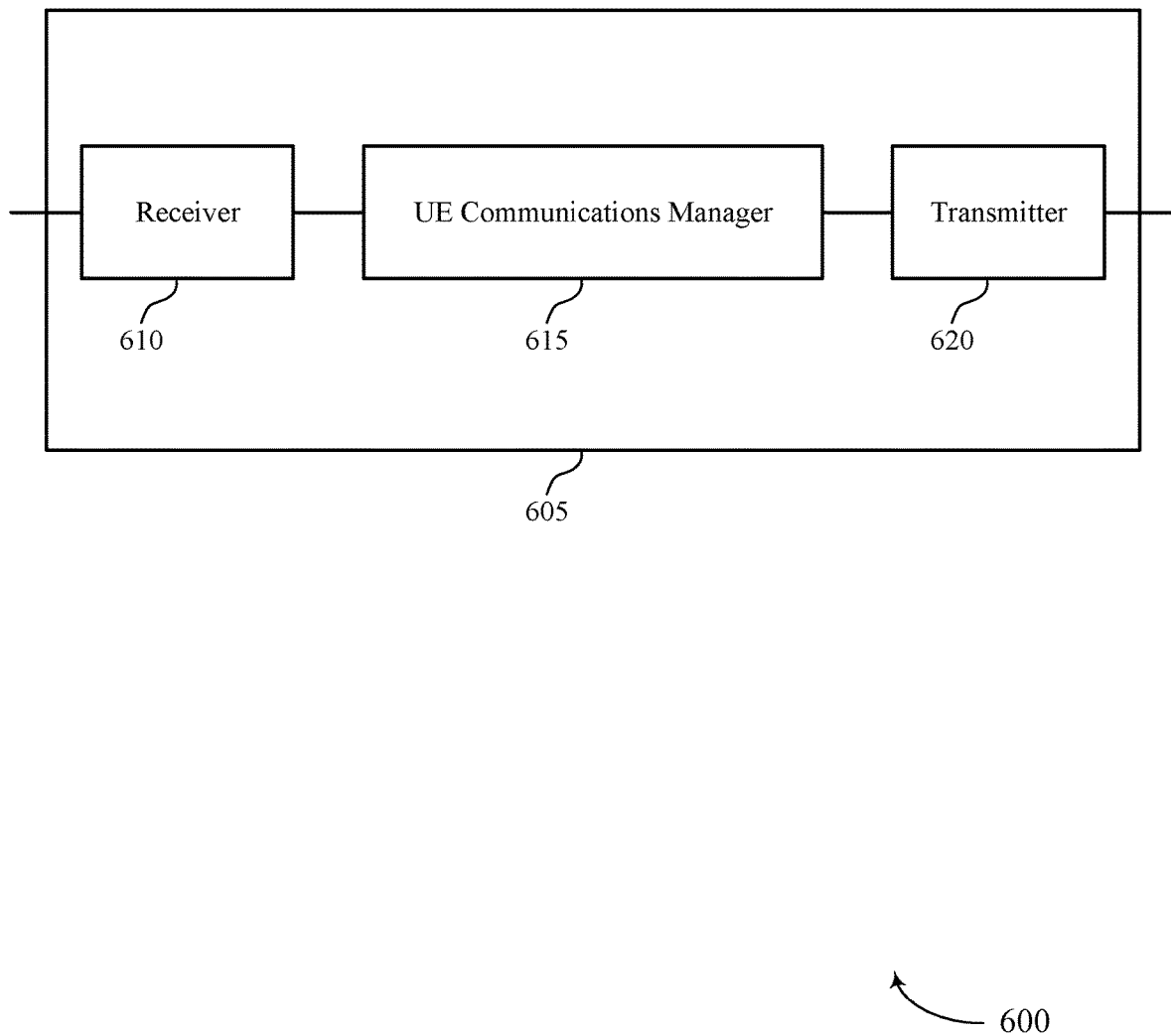
FIGS. 6 and 7 show block diagrams of devices that support outer-loop feedback support for low error rates in accordance with aspects of the present disclosure.

FIG. 6 shows a block diagram 600 of a device 605 that supports outer-loop feedback support for low error rates in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to outer-loop feedback support for low error rates, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive, from a base station, a proxy ACK feedback configuration for communications associated with a target error rate that is below a threshold target error rate. Additionally, the UE communications manager 615 may receive, from the base station, the communications associated with the target error rate. In some cases, the UE communications manager 615 may transmit, to the base station, a first ACK feedback for the communications based on the target error rate and on decoding the communications. Additionally, the UE communications manager 615 may transmit, to the base station, a second ACK feedback for the communications based on the proxy ACK feedback configuration, where the second ACK feedback is associated with a proxy target error rate that is greater than the target error rate. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
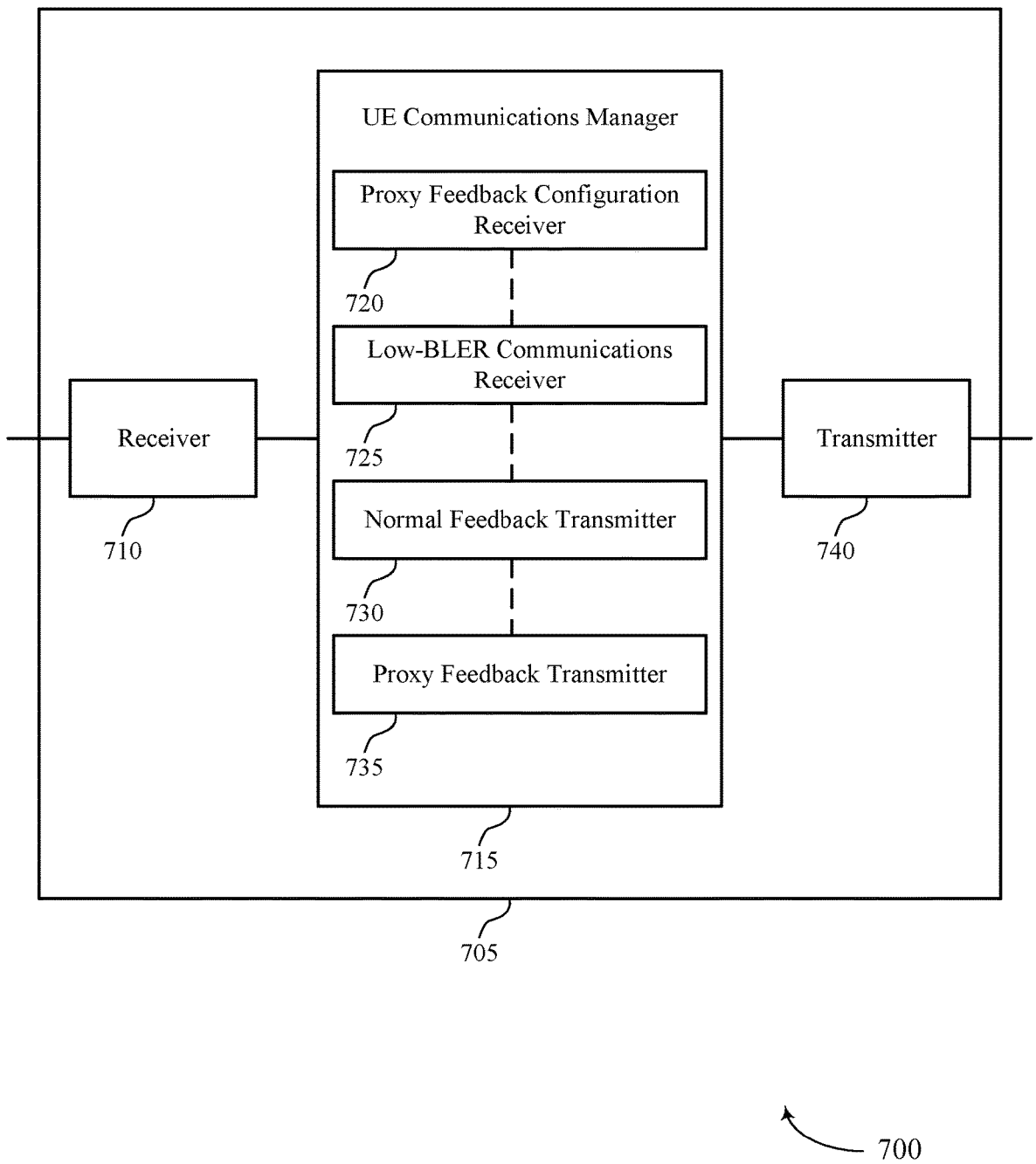

FIG. 7 shows a block diagram 700 of a device 705 that supports outer-loop feedback support for low error rates in accordance with aspects of the present disclosure. The device 705 may be an example of aspects of a device 605, or a UE 115 as described herein. The device 705 may include a receiver 710, a UE communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to outer-loop feedback support for low error rates, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a proxy feedback configuration receiver 720, a low-BLER communications receiver 725, a normal feedback transmitter 730, and a proxy feedback transmitter 735. The UE communications manager 715 may be an example of aspects of the UE communications manager 910 described herein.

The proxy feedback configuration receiver 720 may receive, from a base station, a proxy ACK feedback configuration for communications associated with a target error rate that is below a threshold target error rate.

The low-BLER communications receiver 725 may receive, from the base station, the communications associated with the target error rate.

The normal feedback transmitter 730 may transmit, to the base station, a first ACK feedback for the communications based on the target error rate and on decoding the communications.

The proxy feedback transmitter 735 may transmit, to the base station, a second ACK feedback for the communications based on the proxy ACK feedback configuration, where the second ACK feedback is associated with a proxy target error rate that is greater than the target error rate.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
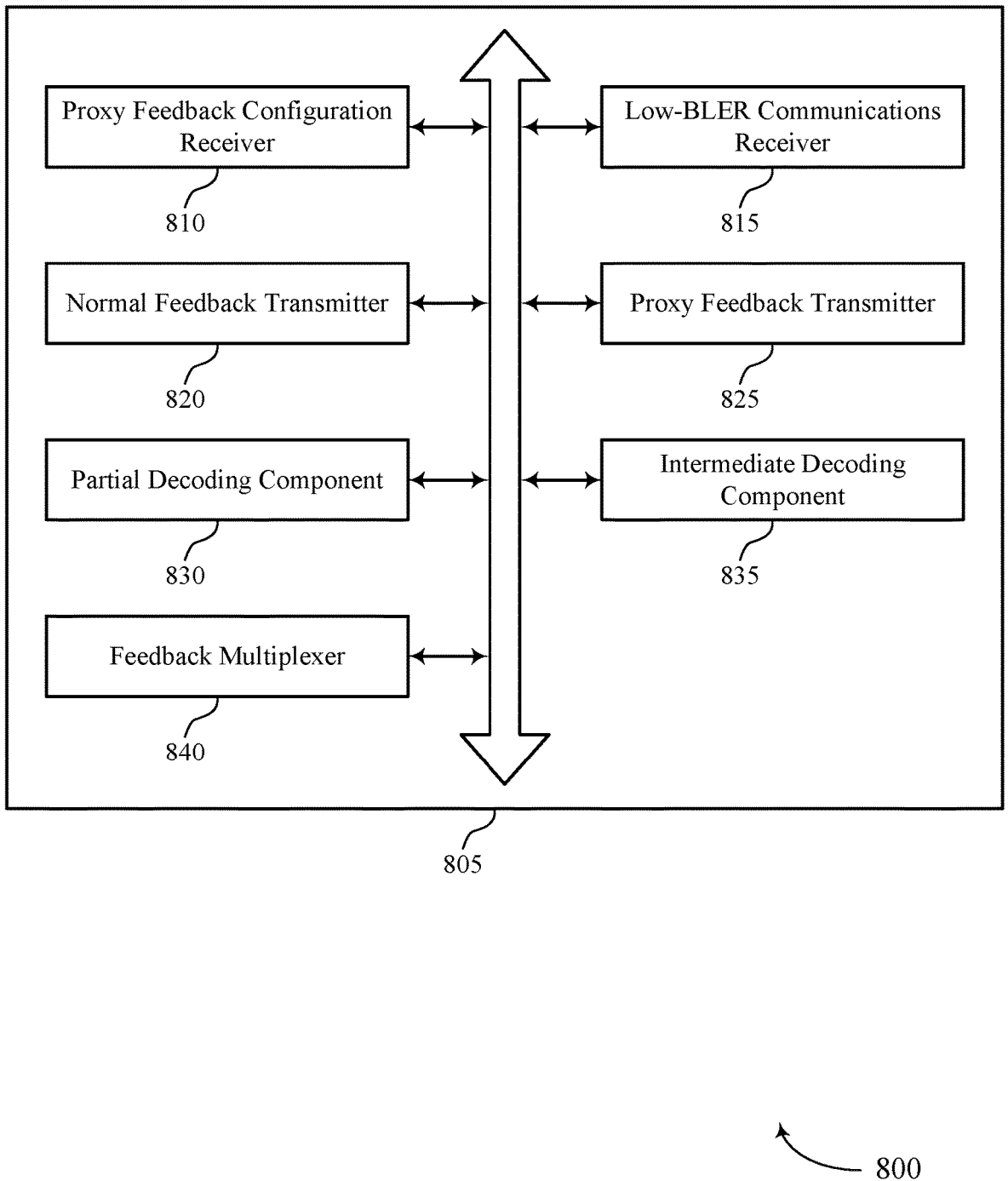
FIG. 8 shows a block diagram of a user equipment (UE) communications manager that supports outer-loop feedback support for low error rates in accordance with aspects of the present disclosure.

FIG. 8 shows a block diagram 800 of a UE communications manager 805 that supports outer-loop feedback support for low error rates in accordance with aspects of the present disclosure. The UE communications manager 805 may be an example of aspects of a UE communications manager 615, a UE communications manager 715, or a UE communications manager 910 described herein. The UE communications manager 805 may include a proxy feedback configuration receiver 810, a low-BLER communications receiver 815, a normal feedback transmitter 820, a proxy feedback transmitter 825, a partial decoding component 830, an intermediate decoding component 835, and a feedback multiplexer 840. Each of these modules may communicate, directly or indirectly, with one another (e.g., via one or more buses).

The proxy feedback configuration receiver 810 may receive, from a base station, a proxy ACK feedback configuration for communications associated with a target error rate that is below a threshold target error rate.

The low-BLER communications receiver 815 may receive, from the base station, the communications associated with the target error rate. In some cases, the communications associated with the target error rate that is below the threshold target error rate include URLLC.

The normal feedback transmitter 820 may transmit, to the base station, a first ACK feedback for the communications based on the target error rate and on decoding the communications.

The proxy feedback transmitter 825 may transmit, to the base station, a second ACK feedback for the communications based on the proxy ACK feedback configuration, where the second ACK feedback is associated with a proxy target error rate that is greater than the target error rate.

The partial decoding component 830 may receive an indication that the UE is to determine the second ACK feedback based on a subset of LLRs to be used for the communications. In some examples, the partial decoding component 830 may receive, via the indication, a proxy down-sampling rate that is less than a down-sampling rate of the communications; decode the communications according to the proxy down-sampling rate, where the subset of LLRs includes LLRs decoded in accordance with the proxy down-sampling rate; and determine the second ACK feedback based on the decoding in accordance with the proxy down-sampling rate. Additionally or alternatively, the partial decoding component 830 may decode a random selection of LLRs of the communications, where the subset of LLRs includes the random selection of LLRs, and determine the second ACK feedback based on the decoding of the random selection of LLRs. In some examples, the partial decoding component 830 may receive the indication as part of the proxy ACK feedback configuration via RRC signaling or as part of a DCI message.

The intermediate decoding component 835 may receive an indication that the UE is to determine the second ACK feedback based on an intermediate decoding of the communications. In some examples, the intermediate decoding component 835 may receive, via the indication, a number of decoding iterations to be used for the intermediate decoding, where the number of decoding iterations is less than a total number of decoding iterations to be used by the UE for decoding an entirety of the communications and is associated with the intermediate decoding. Accordingly, the intermediate decoding component 835 may decode the communications according to the number of decoding iterations and determine the second ACK feedback based on the decoding by the number of decoding iterations. In some examples, the intermediate decoding component 835 may receive the indication as part of the proxy ACK feedback configuration via RRC signaling or as part of a DCI message. Additionally, the number of decoding iterations may correspond to the proxy target error rate that is greater than the target error rate.

The feedback multiplexer 840 may multiplex the first ACK feedback with the second ACK feedback. In some cases, the second ACK feedback may be transmitted less frequently than the first ACK feedback.

Figure 9:
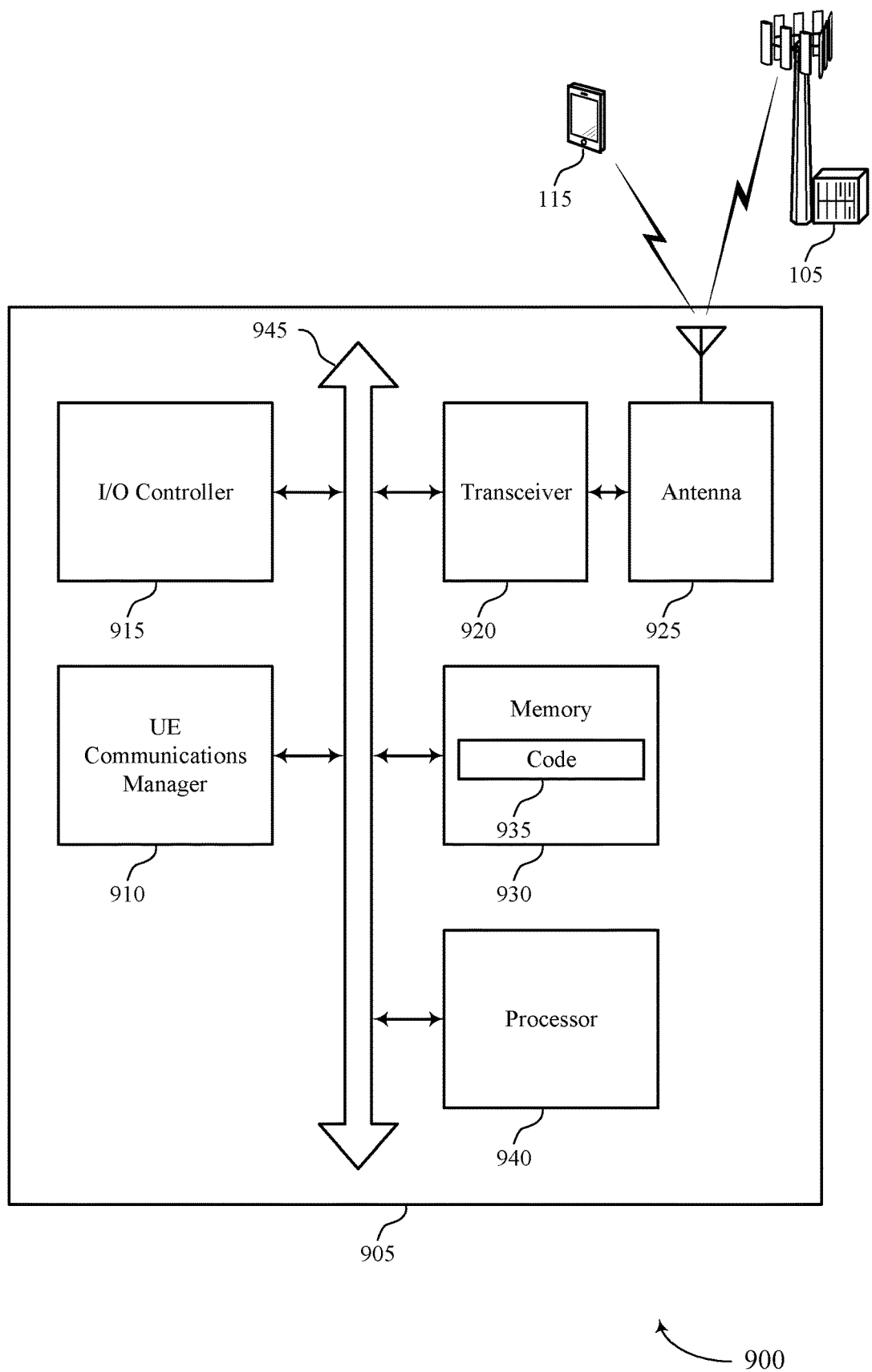
FIG. 9 shows a diagram of a system including a device that supports outer-loop feedback support for low error rates in accordance with aspects of the present disclosure.

FIG. 9 shows a diagram of a system 900 including a device 905 that supports outer-loop feedback support for low error rates in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive, from a base station, a proxy ACK feedback configuration for communications associated with a target error rate that is below a threshold target error rate. Additionally, the UE communications manager 910 may receive, from the base station, the communications associated with the target error rate. In some cases, the UE communications manager 910 may transmit, to the base station, a first ACK feedback for the communications based on the target error rate and on decoding the communications. Additionally, the UE communications manager 910 may transmit, to the base station, a second ACK feedback for the communications based on the proxy ACK feedback configuration, where the second ACK feedback is associated with a proxy target error rate that is greater than the target error rate.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting outer-loop feedback support for low error rates).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
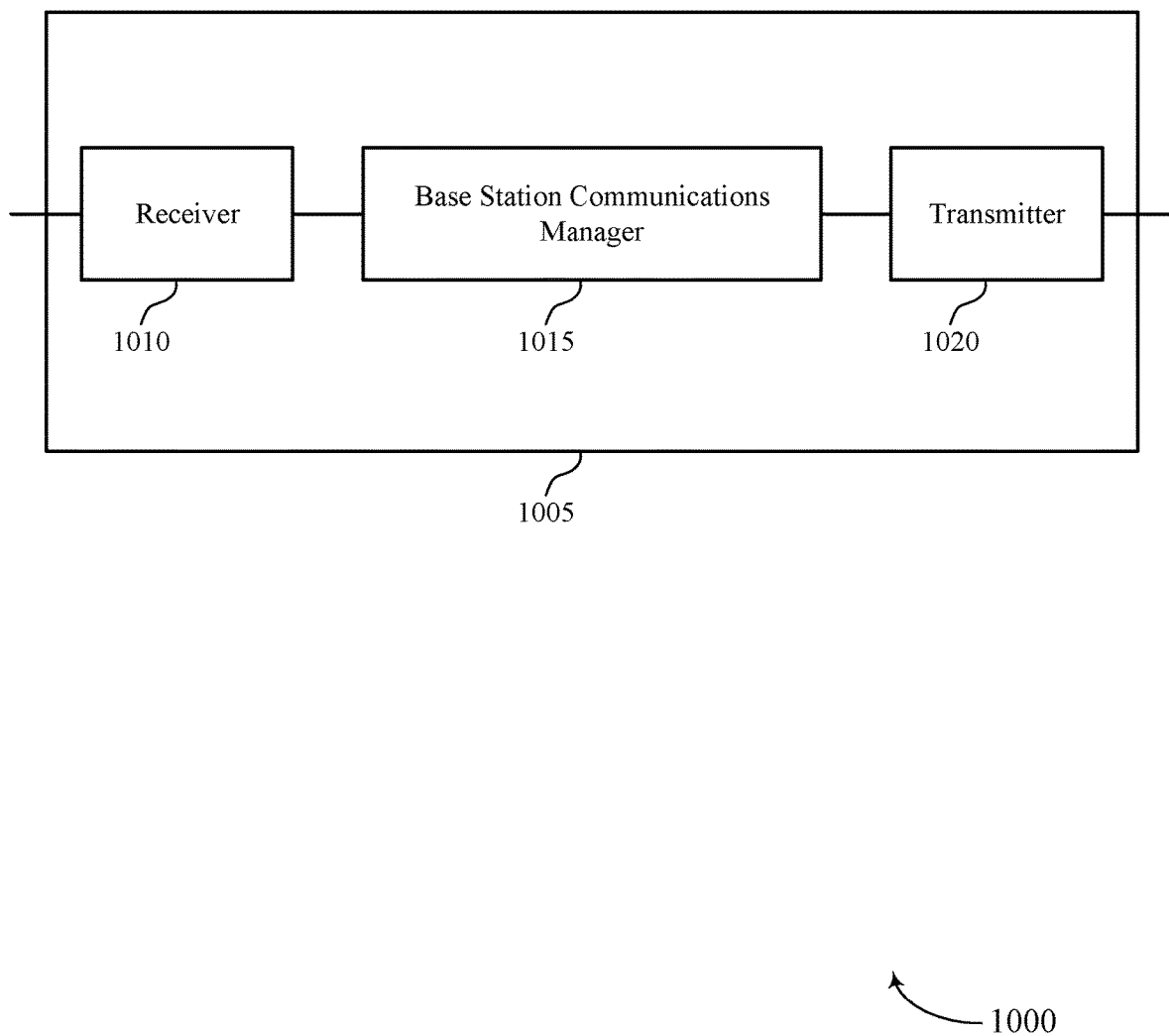
FIGS. 10 and 11 show block diagrams of devices that support outer-loop feedback support for low error rates in accordance with aspects of the present disclosure.

FIG. 10 shows a block diagram 1000 of a device 1005 that supports outer-loop feedback support for low error rates in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to outer-loop feedback support for low error rates, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit, to a UE, a proxy ACK feedback configuration for communications associated with a target error rate that is below a threshold target error rate. Additionally, the base station communications manager 1015 may transmit, to the UE, the communications associated with the target error rate. In some cases, the base station communications manager 1015 may receive, from the UE, first ACK feedback for the communications based on the target error rate and on a result of the UE decoding the communications. Additionally, the base station communications manager 1015 may receive, from the UE, a second ACK feedback for the communications based on the proxy ACK feedback configuration, where the second ACK feedback is associated with a proxy target error rate that is greater than the target error rate.

Additionally or alternatively, the base station communications manager 1015 may transmit, to a UE, a first wireless communication associated with a first target error rate. In some cases, the base station communications manager 1015 may transmit, to the UE, a second wireless communication associated with a second target error rate that is greater than the first target error rate. Additionally, the base station communications manager 1015 may receive ACK feedback for the second wireless communication, where the ACK feedback is based on successful reception of the second wireless communication in accordance with the second target error rate. In some cases, the base station communications manager 1015 may adjust an outer-loop power parameter for the first wireless communication based on the ACK feedback for the second wireless communication. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
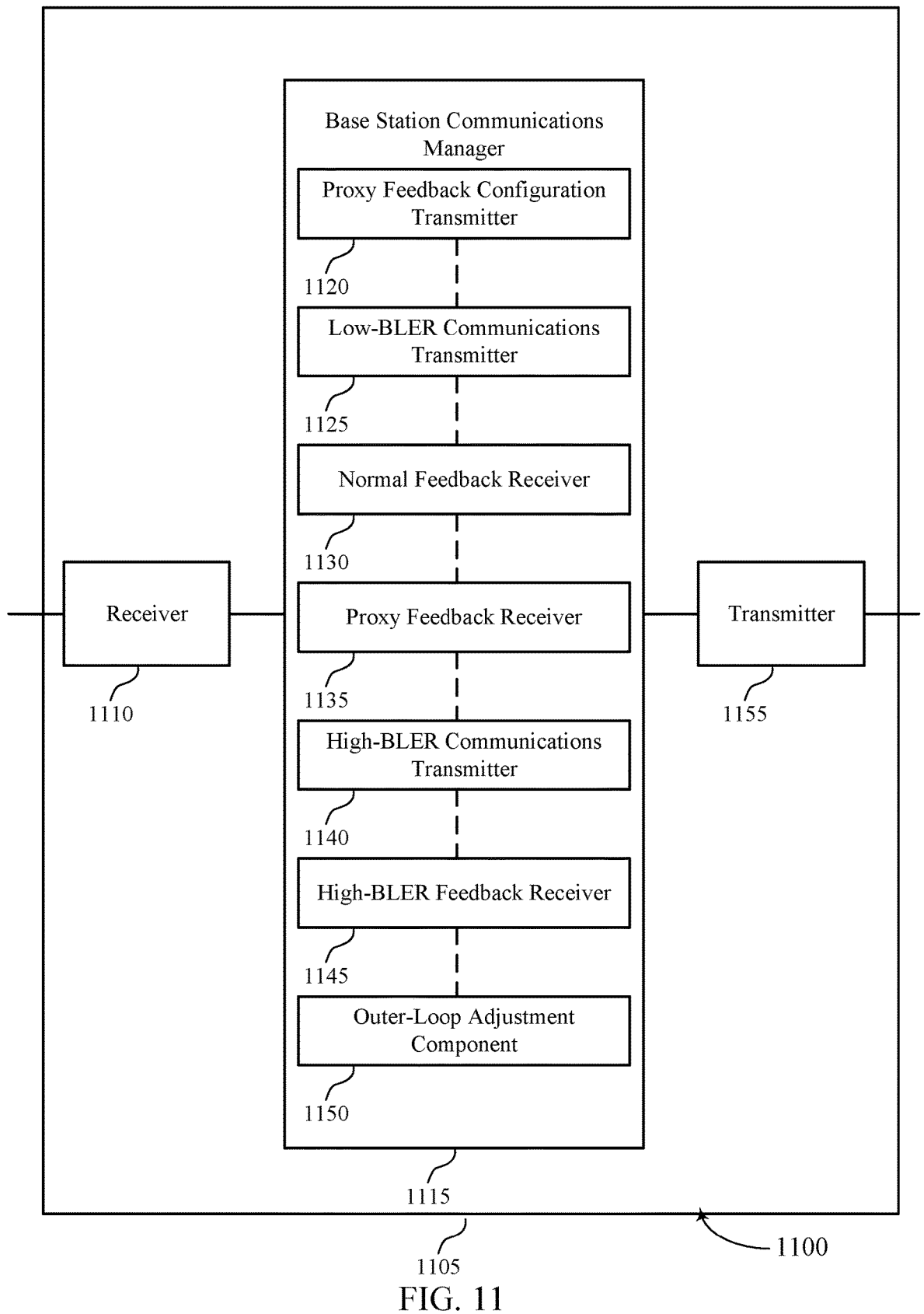

FIG. 11 shows a block diagram 1100 of a device 1105 that supports outer-loop feedback support for low error rates in accordance with aspects of the present disclosure. The device 1105 may be an example of aspects of a device 1005, or a base station 105 as described herein. The device 1105 may include a receiver 1110, a base station communications manager 1115, and a transmitter 1155. The device 1105 may also include a processor. Each of these components may be in communication with one another (e.g., via one or more buses).

The receiver 1110 may receive information such as packets, user data, or control information associated with various information channels (e.g., control channels, data channels, and information related to outer-loop feedback support for low error rates, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a proxy feedback configuration transmitter 1120, a low-BLER communications transmitter 1125, a normal feedback receiver 1130, a proxy feedback receiver 1135, a high-BLER communications transmitter 1140, a high-BLER feedback receiver 1145, and an outer-loop adjustment component 1150. The base station communications manager 1115 may be an example of aspects of the base station communications manager 1310 described herein.

The proxy feedback configuration transmitter 1120 may transmit, to a UE, a proxy ACK feedback configuration for communications associated with a target error rate that is below a threshold target error rate.

The low-BLER communications transmitter 1125 may transmit, to the UE, the communications associated with the target error rate.

The normal feedback receiver 1130 may receive, from the UE, first ACK feedback for the communications based on the target error rate and on a result of the UE decoding the communications.

The proxy feedback receiver 1135 may receive, from the UE, a second ACK feedback for the communications based on the proxy ACK feedback configuration, where the second ACK feedback is associated with a proxy target error rate that is greater than the target error rate.

Additionally or alternatively, the low-BLER communications transmitter 1125 may transmit, to a UE, a first wireless communication associated with a first target error rate.

The high-BLER communications transmitter 1140 may transmit, to the UE, a second wireless communication associated with a second target error rate that is greater than the first target error rate.

The high-BLER feedback receiver 1145 may receive ACK feedback for the second wireless communication, where the ACK feedback is based on successful reception of the second wireless communication in accordance with the second target error rate.

The outer-loop adjustment component 1150 may adjust an outer-loop power parameter for the first wireless communication based on the ACK feedback for the second wireless communication.

The transmitter 1155 may transmit signals generated by other components of the device 1105. In some examples, the transmitter 1155 may be collocated with a receiver 1110 in a transceiver module. For example, the transmitter 1155 may be an example of aspects of the transceiver 1320 described with reference to FIG. 13. The transmitter 1155 may utilize a single antenna or a set of antennas.

Figure 12:
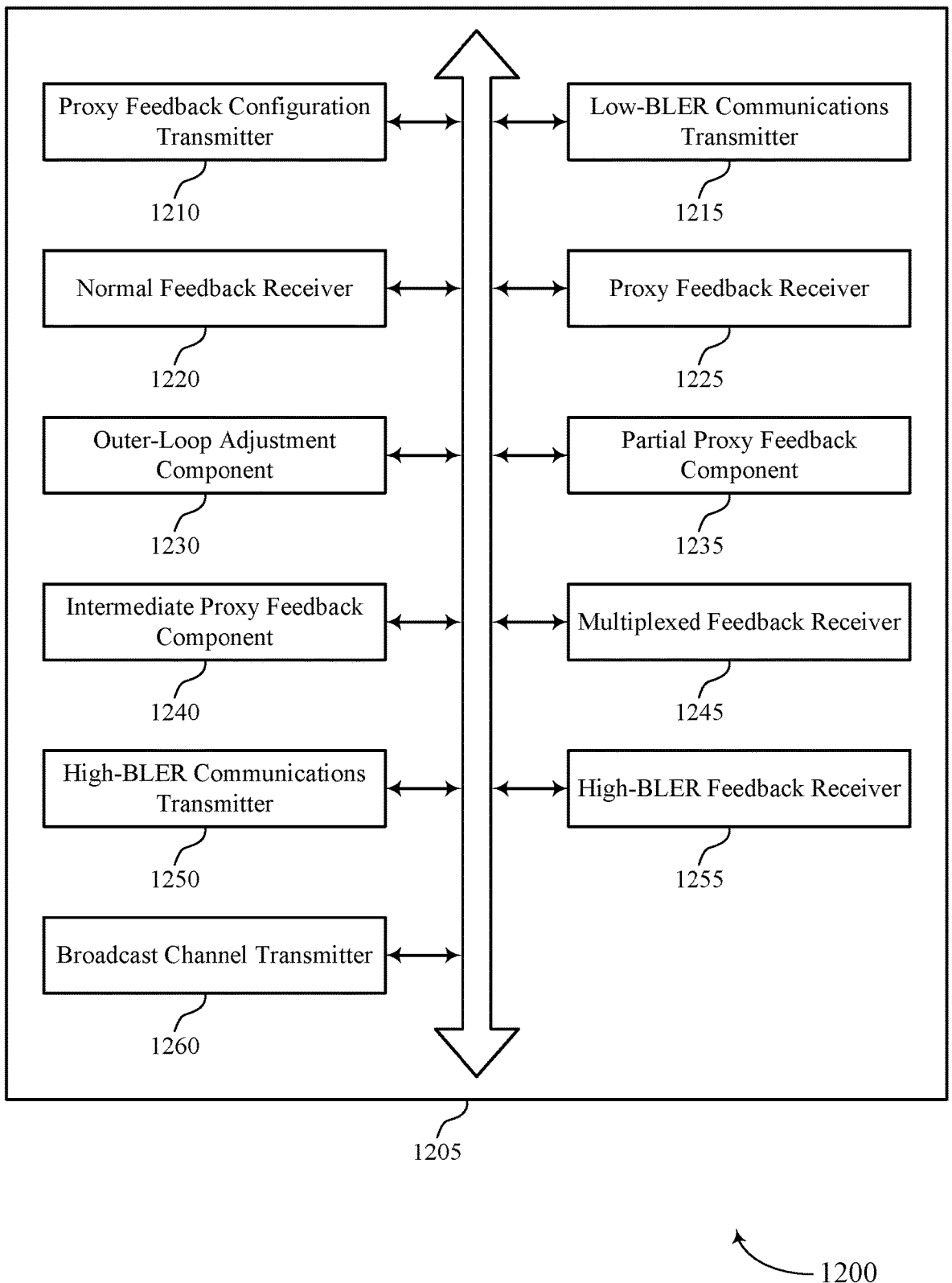
FIG. 12 shows a block diagram of a base station communications manager that supports outer-loop feedback support for low error rates in accordance with aspects of the present disclosure.

FIG. 12 shows a block diagram 1200 of a base station communications manager 1205 that supports outer-loop feedback support for low error rates in accordance with aspects of the present disclosure. The base station communications manager 1205 may be an example of aspects of a base station communications manager 1015, a base station communications manager 1115, or a base station communications manager 1310 described herein. The base station communications manager 1205 may include a proxy feedback configuration transmitter 1210, a low-BLER communications transmitter 1215, a normal feedback receiver 1220, a proxy feedback receiver 1225, an outer-loop adjustment component 1230, a partial proxy feedback component 1235, an intermediate proxy feedback component 1240, a multiplexed feedback receiver 1245, a high-BLER communications transmitter 1250, a high-BLER feedback receiver 1255, and a broadcast channel transmitter 1260. Each of these modules may communicate, directly or indirectly, with one another (e.g., via one or more buses).

The proxy feedback configuration transmitter 1210 may transmit, to a UE, a proxy ACK feedback configuration for communications associated with a target error rate that is below a threshold target error rate.

The low-BLER communications transmitter 1215 may transmit, to the UE, the communications associated with the target error rate. In some examples, the low-BLER communications transmitter 1215 may transmit, to a UE, a first wireless communication associated with a first target error rate. In some cases, the communications associated with the target error rate that is below the threshold target error rate include URLLC.

The normal feedback receiver 1220 may receive, from the UE, first ACK feedback for the communications based on the target error rate and on a result of the UE decoding the communications.

The proxy feedback receiver 1225 may receive, from the UE, a second ACK feedback for the communications based on the proxy ACK feedback configuration, where the second ACK feedback is associated with a proxy target error rate that is greater than the target error rate.

The outer-loop adjustment component 1230 may adjust an outer-loop power parameter for the first wireless communication based on the ACK feedback for the second wireless communication. In some examples, the outer-loop adjustment component 1230 may adjust the first wireless communication based on an offset between a signal quality difference of the first target error rate and the second target error rate. In some examples, the outer-loop adjustment component 1230 may select a predetermined value for the offset. In some examples, the outer-loop adjustment component 1230 may receive additional ACK feedback for unicast communications associated with the first wireless communications from one or more UEs. In some examples, the outer-loop adjustment component 1230 may adapt the offset based on the additional ACK feedback, where the offset is shared across the one or more UEs.

Additionally or alternatively, the outer-loop adjustment component 1230 may update outer loop power settings for the communications associated with the target error rate based on receiving the second ACK feedback. In some examples, the outer-loop adjustment component 1230 may transmit, to the UE, additional communications associated with the target error rate in accordance with the updated outer loop power settings.

The high-BLER communications transmitter 1250 may transmit, to the UE, a second wireless communication associated with a second target error rate that is greater than the first target error rate. In some cases, the first wireless communication may include URLLC traffic, and the second wireless communication may include eMBB traffic or dummy eMBB traffic.

Additionally or alternatively, the first wireless communication may include URLLC, and the second wireless communication may include one or more broadcast channel transmissions with different RNTIs.

The high-BLER feedback receiver 1255 may receive ACK feedback for the second wireless communication, where the ACK feedback is based on successful reception of the second wireless communication in accordance with the second target error rate.

The partial proxy feedback component 1235 may transmit an indication that the UE is to determine the second ACK feedback based on a subset of LLRs to be used for the communications. In some examples, the partial proxy feedback component 1235 may transmit, via the indication, a proxy down-sampling rate that is less than a down-sampling rate of the communications, where the subset of LLRs includes LLRs decoded in accordance with the proxy down-sampling rate or a random selection of LLRs. In some examples, the partial proxy feedback component 1235 may estimate a SNR gap between the first ACK feedback and the second ACK feedback based on the proxy down-sampling rate. In some examples, the partial proxy feedback component 1235 may adjust the proxy down-sampling rate to achieve the proxy target error rate based on a difference between a predetermined SNR gap between the proxy target error rate and the target error rate and the estimated SNR gap. In some examples, the partial proxy feedback component 1235 may transmit the indication as part of the proxy ACK feedback configuration via RRC signaling or as part of a DCI message.

The intermediate proxy feedback component 1240 may transmit an indication that the UE is to determine the second ACK feedback based on an intermediate decoding of the communications. In some examples, the intermediate proxy feedback component 1240 may transmit, via the indication, a number of decoding iterations to be used for the intermediate decoding, where the number of decoding iterations is less than a total number of decoding iterations to be used by the UE for decoding an entirety of the communications and is associated with the intermediate decoding. In some examples, the intermediate proxy feedback component 1240 may transmit the indication as part of the proxy ACK feedback configuration via RRC signaling or as part of a DCI message. In some cases, the number of decoding iterations may correspond to the proxy target error rate that is greater than the first target error rate.

The multiplexed feedback receiver 1245 may receive, from the UE, a multiplexed feedback message including the first ACK feedback and the second ACK feedback. In some cases, the second ACK feedback may be received less frequently than the first ACK feedback.

The broadcast channel transmitter 1260 may configure a UE to monitor the one or more broadcast channel transmissions and to report ACK feedback for the one or more broadcast channel transmissions. In some examples, the broadcast channel transmitter 1260 may adjust an offset for outer-loop power control of the first wireless communication with the UE based on a known gap between the first target error rate and the second target error rate, where the second target error rate corresponds to an MCS for the one or more broadcast transmissions.

Figure 13:
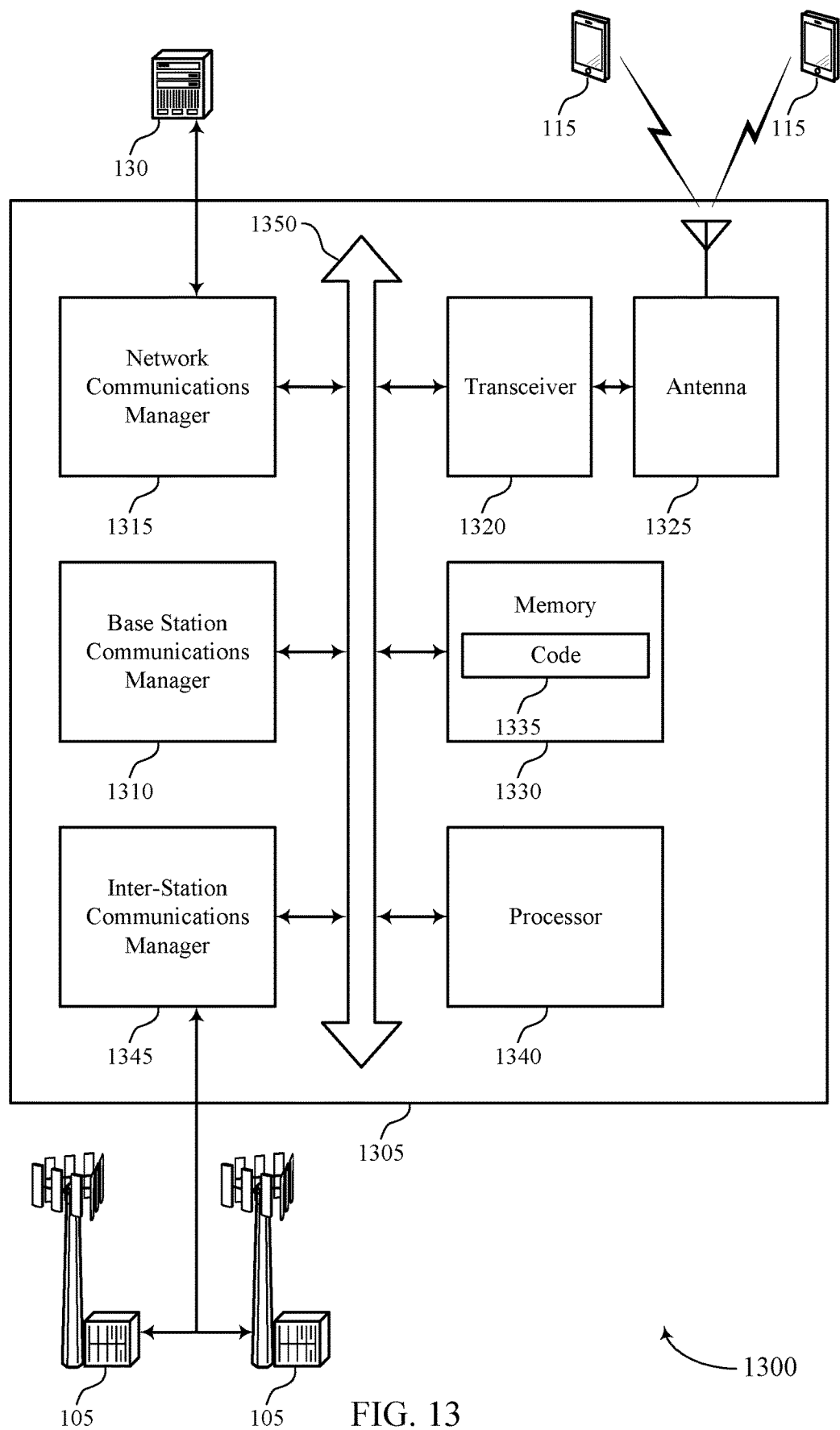
FIG. 13 shows a diagram of a system including a device that supports outer-loop feedback support for low error rates in accordance with aspects of the present disclosure.

FIG. 13 shows a diagram of a system 1300 including a device 1305 that supports outer-loop feedback support for low error rates in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit, to a UE, a proxy ACK feedback configuration for communications associated with a target error rate that is below a threshold target error rate. Additionally, the base station communications manager 1310 may transmit, to the UE, the communications associated with the target error rate. In some cases, the base station communications manager 1310 may receive, from the UE, first ACK feedback for the communications based on the target error rate and on a result of the UE decoding the communications. Additionally, the base station communications manager 1310 may receive, from the UE, a second ACK feedback for the communications based on the proxy ACK feedback configuration, where the second ACK feedback is associated with a proxy target error rate that is greater than the target error rate.

Additionally or alternatively, the base station communications manager 1310 may transmit, to a UE, a first wireless communication associated with a first target error rate. In some cases, the base station communications manager 1310 may transmit, to the UE, a second wireless communication associated with a second target error rate that is greater than the first target error rate. Additionally, the base station communications manager 1310 may receive ACK feedback for the second wireless communication, where the ACK feedback is based on successful reception of the second wireless communication in accordance with the second target error rate. In some cases, the base station communications manager 1310 may adjust an outer-loop power parameter for the first wireless communication based on the ACK feedback for the second wireless communication.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting outer-loop feedback support for low error rates).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
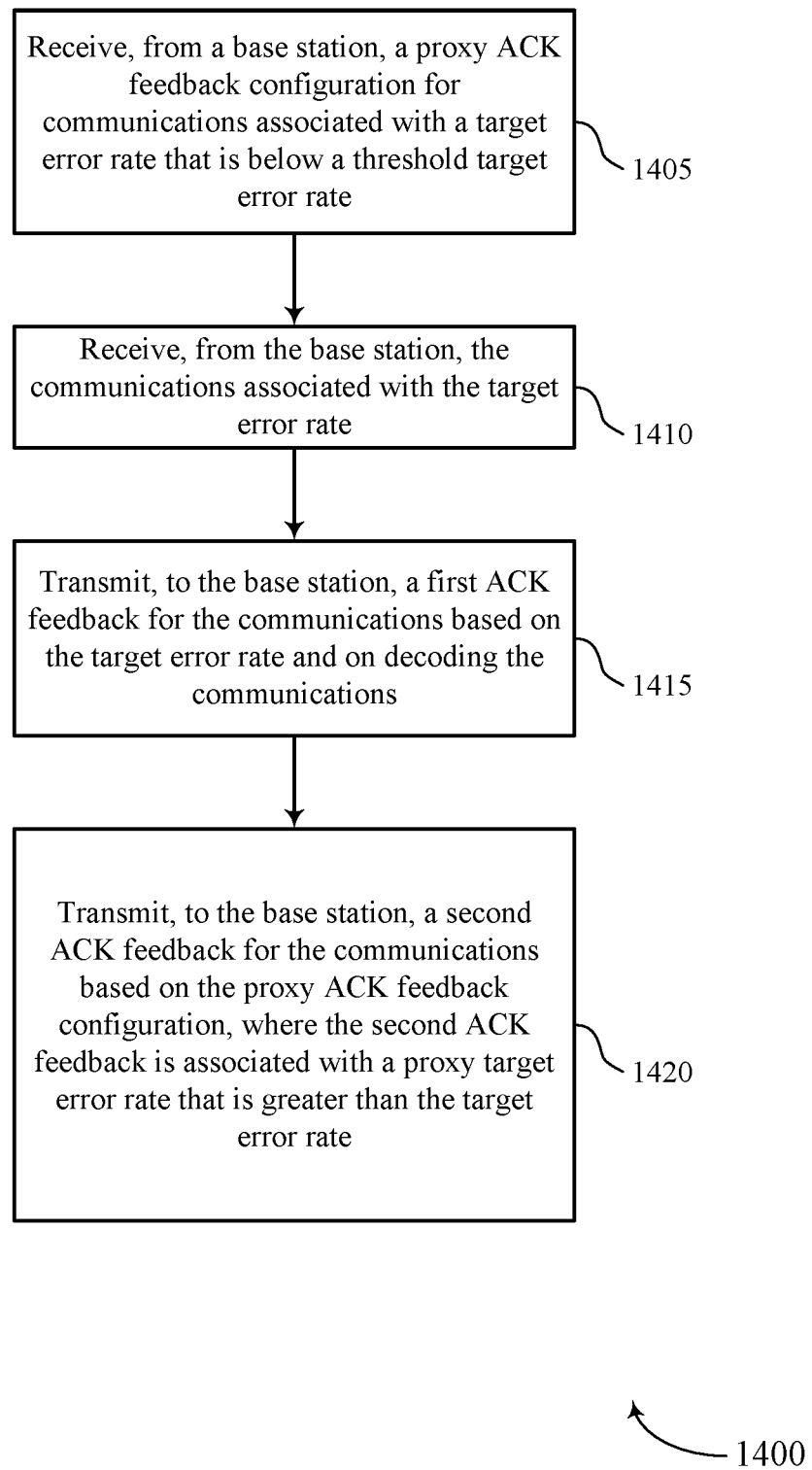
FIGS. 14 through 20 show flowcharts illustrating methods that support outer-loop feedback support for low error rates in accordance with aspects of the present disclosure.

FIG. 14 shows a flowchart illustrating a method 1400 that supports outer-loop feedback support for low error rates in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a proxy ACK feedback configuration for communications associated with a target error rate that is below a threshold target error rate. The operations of 1405 may be performed according to the methods described herein. In some examples, aspects of the operations of 1405 may be performed by a proxy feedback configuration receiver as described with reference to FIGS. 6 through 9.

At 1410, the UE may receive, from the base station, the communications associated with the target error rate. The operations of 1410 may be performed according to the methods described herein. In some examples, aspects of the operations of 1410 may be performed by a low-BLER communications receiver as described with reference to FIGS. 6 through 9.

At 1415, the UE may transmit, to the base station, a first ACK feedback for the communications based on the target error rate and on decoding the communications. The operations of 1415 may be performed according to the methods described herein. In some examples, aspects of the operations of 1415 may be performed by a normal feedback transmitter as described with reference to FIGS. 6 through 9.

At 1420, the UE may transmit, to the base station, a second ACK feedback for the communications based on the proxy ACK feedback configuration, where the second ACK feedback is associated with a proxy target error rate that is greater than the target error rate. The operations of 1420 may be performed according to the methods described herein. In some examples, aspects of the operations of 1420 may be performed by a proxy feedback transmitter as described with reference to FIGS. 6 through 9.

Figure 15:
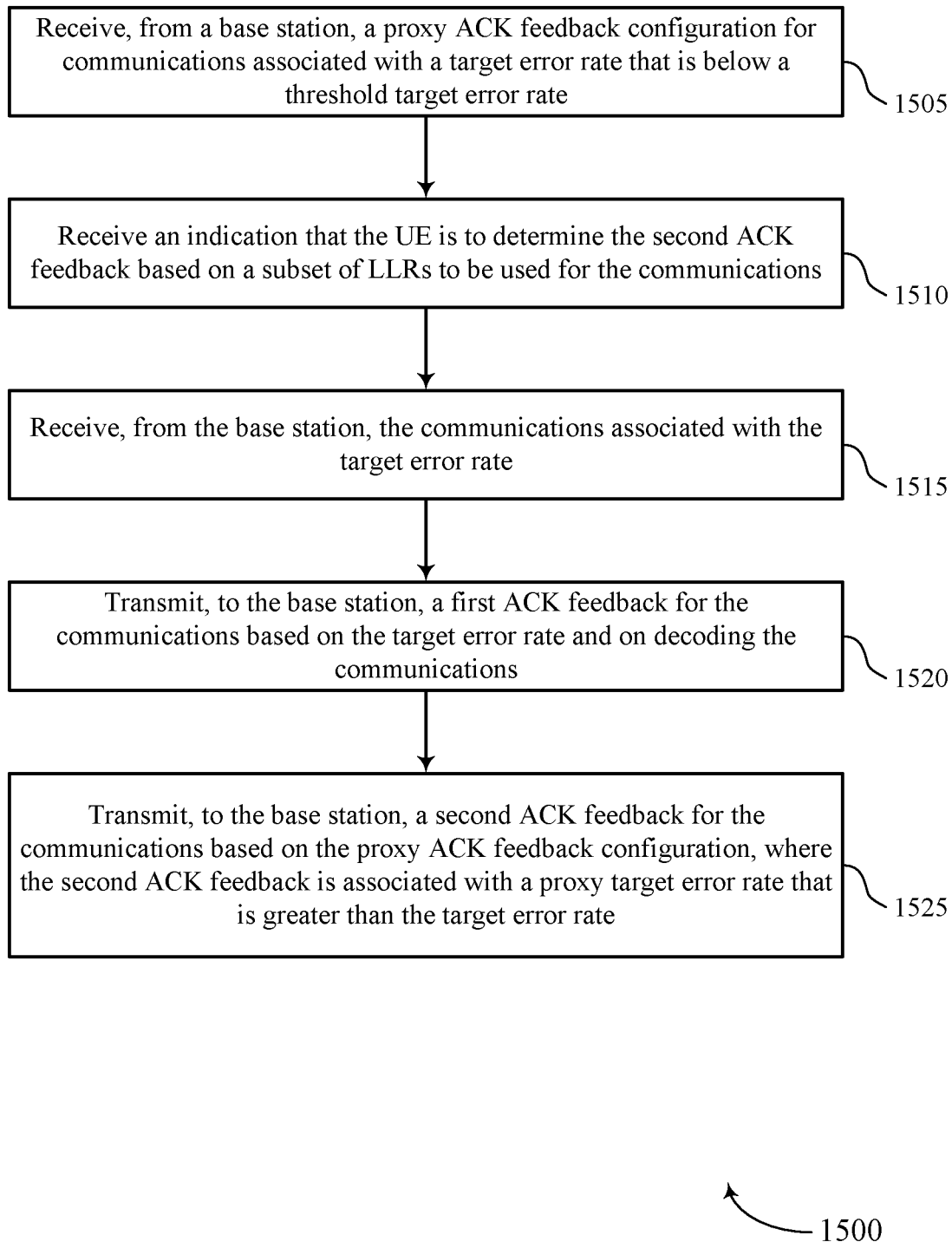

FIG. 15 shows a flowchart illustrating a method 1500 that supports outer-loop feedback support for low error rates in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a proxy ACK feedback configuration for communications associated with a target error rate that is below a threshold target error rate. The operations of 1505 may be performed according to the methods described herein. In some examples, aspects of the operations of 1505 may be performed by a proxy feedback configuration receiver as described with reference to FIGS. 6 through 9.

At 1510, the UE may receive an indication that the UE is to determine the second ACK feedback based on a subset of LLRs to be used for the communications. The operations of 1510 may be performed according to the methods described herein. In some examples, aspects of the operations of 1510 may be performed by a partial decoding component as described with reference to FIGS. 6 through 9.

At 1515, the UE may receive, from the base station, the communications associated with the target error rate. The operations of 1515 may be performed according to the methods described herein. In some examples, aspects of the operations of 1515 may be performed by a low-BLER communications receiver as described with reference to FIGS. 6 through 9.

At 1520, the UE may transmit, to the base station, a first ACK feedback for the communications based on the target error rate and on decoding the communications. The operations of 1520 may be performed according to the methods described herein. In some examples, aspects of the operations of 1520 may be performed by a normal feedback transmitter as described with reference to FIGS. 6 through 9.

At 1525, the UE may transmit, to the base station, a second ACK feedback for the communications based on the proxy ACK feedback configuration, where the second ACK feedback is associated with a proxy target error rate that is greater than the target error rate. The operations of 1525 may be performed according to the methods described herein. In some examples, aspects of the operations of 1525 may be performed by a proxy feedback transmitter as described with reference to FIGS. 6 through 9.

Figure 16:
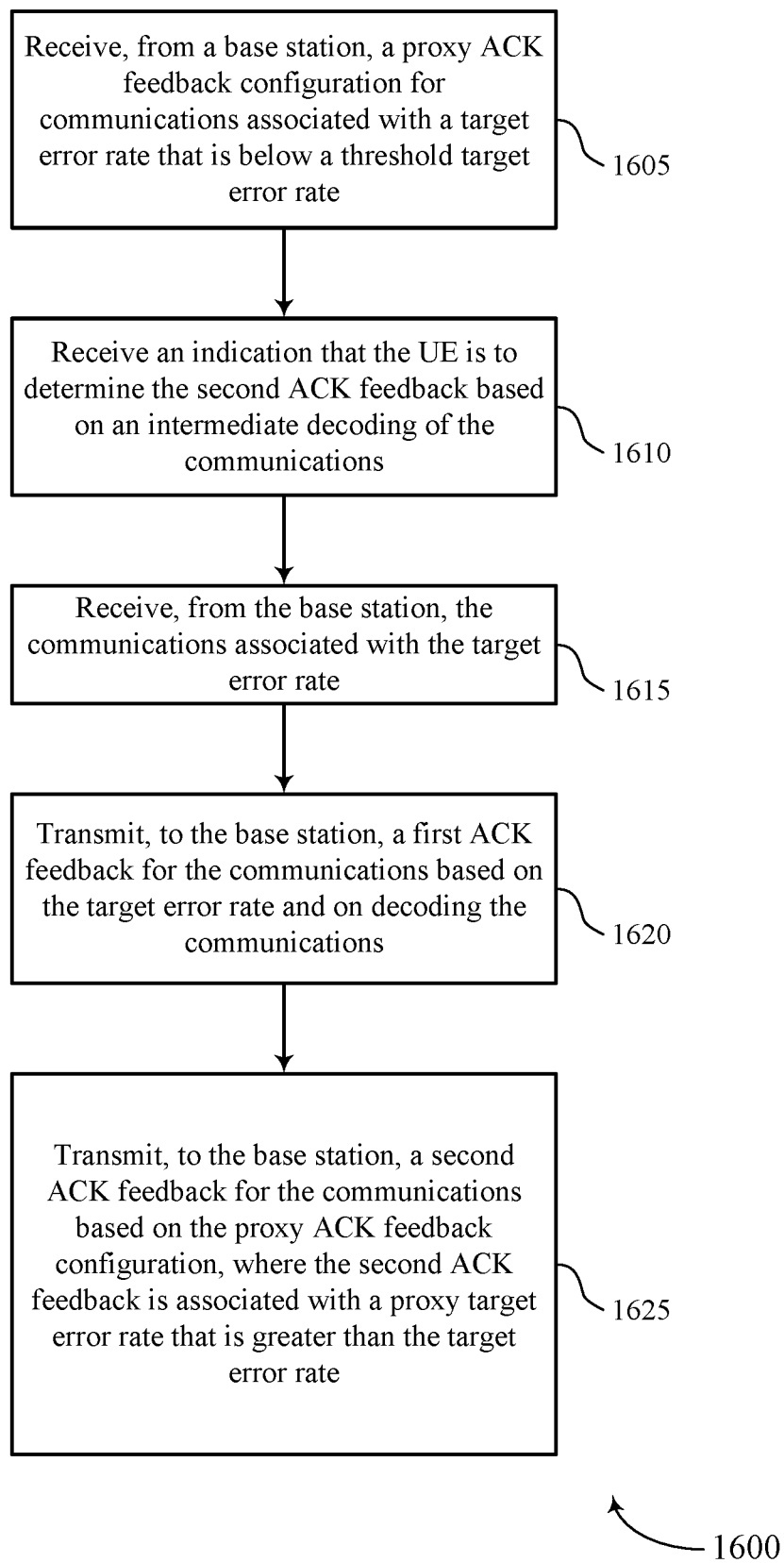

FIG. 16 shows a flowchart illustrating a method 1600 that supports outer-loop feedback support for low error rates in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a proxy ACK feedback configuration for communications associated with a target error rate that is below a threshold target error rate. The operations of 1605 may be performed according to the methods described herein. In some examples, aspects of the operations of 1605 may be performed by a proxy feedback configuration receiver as described with reference to FIGS. 6 through 9.

At 1610, the UE may receive an indication that the UE is to determine the second ACK feedback based on an intermediate decoding of the communications. The operations of

1610 may be performed according to the methods described herein. In some examples, aspects of the operations of 1610 may be performed by an intermediate decoding component as described with reference to FIGS. 6 through 9.

At 1615, the UE may receive, from the base station, the communications associated with the target error rate. The operations of 1615 may be performed according to the methods described herein. In some examples, aspects of the operations of 1615 may be performed by a low-BLER communications receiver as described with reference to FIGS. 6 through 9.

At 1620, the UE may transmit, to the base station, a first ACK feedback for the communications based on the target error rate and on decoding the communications. The operations of 1620 may be performed according to the methods described herein. In some examples, aspects of the operations of 1620 may be performed by a normal feedback transmitter as described with reference to FIGS. 6 through 9.

At 1625, the UE may transmit, to the base station, a second ACK feedback for the communications based on the proxy ACK feedback configuration, where the second ACK feedback is associated with a proxy target error rate that is greater than the target error rate. The operations of 1625 may be performed according to the methods described herein. In some examples, aspects of the operations of 1625 may be performed by a proxy feedback transmitter as described with reference to FIGS. 6 through 9.

Figure 17:
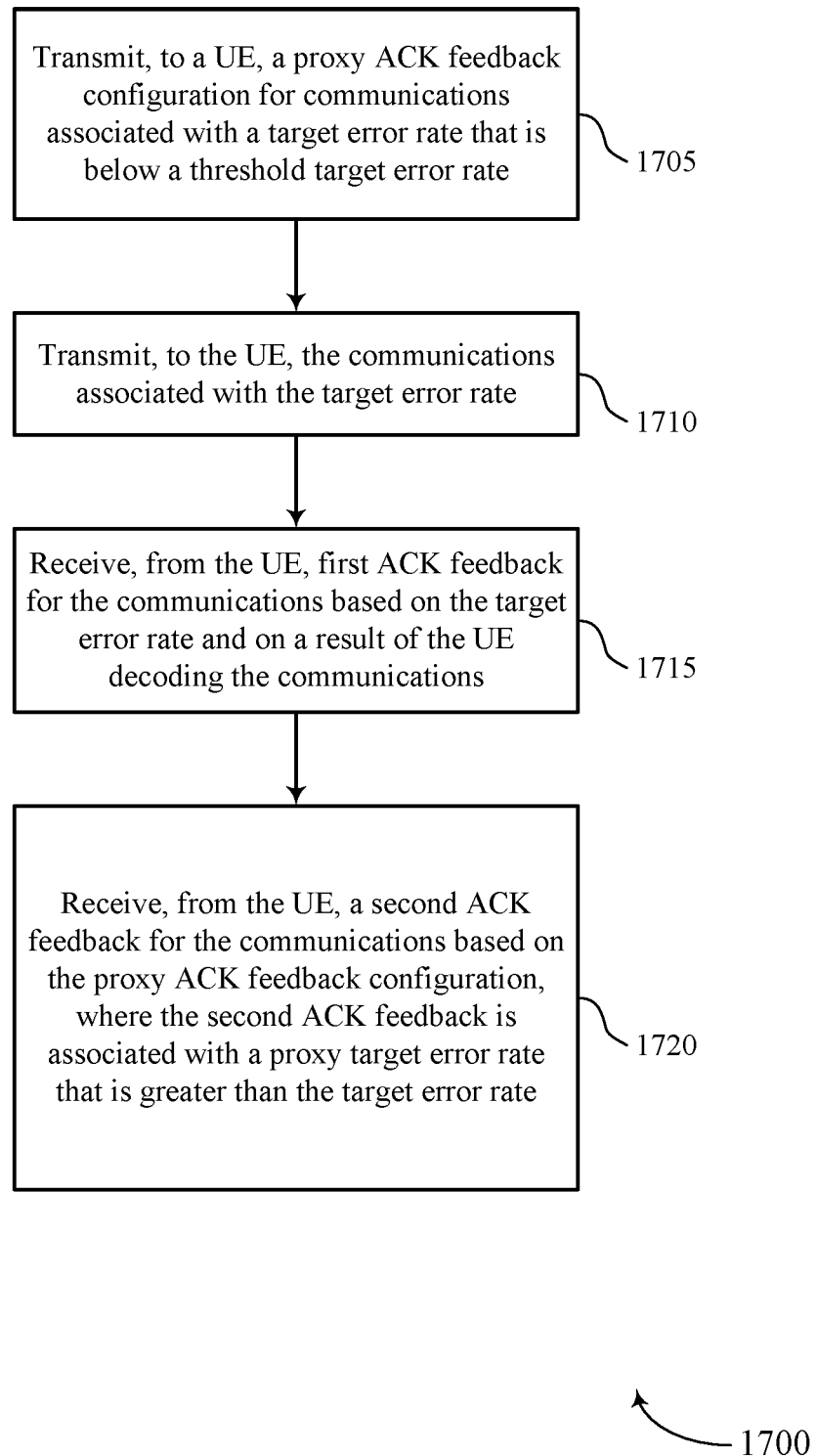

FIG. 17 shows a flowchart illustrating a method 1700 that supports outer-loop feedback support for low error rates in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a proxy ACK feedback configuration for communications associated with a target error rate that is below a threshold target error rate. The operations of 1705 may be performed according to the methods described herein. In some examples, aspects of the operations of 1705 may be performed by a proxy feedback configuration transmitter as described with reference to FIGS. 10 through 13.

At 1710, the base station may transmit, to the UE, the communications associated with the target error rate. The operations of 1710 may be performed according to the methods described herein. In some examples, aspects of the operations of 1710 may be performed by a low-BLER communications transmitter as described with reference to FIGS. 10 through 13.

At 1715, the base station may receive, from the UE, first ACK feedback for the communications based on the target error rate and on a result of the UE decoding the communications. The operations of 1715 may be performed according to the methods described herein. In some examples, aspects of the operations of 1715 may be performed by a normal feedback receiver as described with reference to FIGS. 10 through 13.

At 1720, the base station may receive, from the UE, a second ACK feedback for the communications based on the proxy ACK feedback configuration, where the second ACK feedback is associated with a proxy target error rate that is greater than the target error rate. The operations of 1720 may be performed according to the methods described herein. In some examples, aspects of the operations of 1720 may be performed by a proxy feedback receiver as described with reference to FIGS. 10 through 13.

Figure 18:
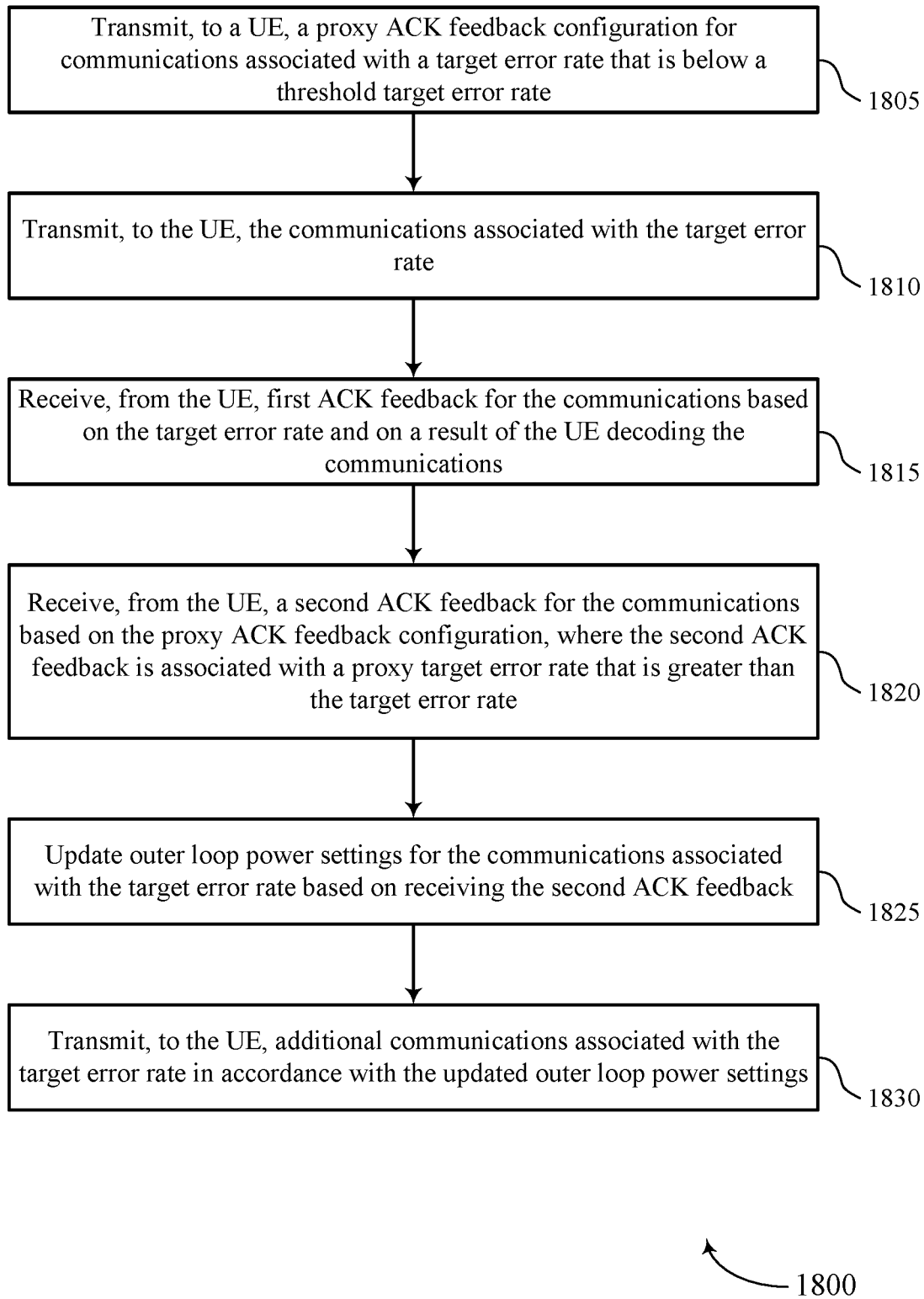

FIG. 18 shows a flowchart illustrating a method 1800 that supports outer-loop feedback support for low error rates in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a proxy ACK feedback configuration for communications associated with a target error rate that is below a threshold target error rate. The operations of 1805 may be performed according to the methods described herein. In some examples, aspects of the operations of 1805 may be performed by a proxy feedback configuration transmitter as described with reference to FIGS. 10 through 13.

At 1810, the base station may transmit, to the UE, the communications associated with the target error rate. The operations of 1810 may be performed according to the methods described herein. In some examples, aspects of the operations of 1810 may be performed by a low-BLER communications transmitter as described with reference to FIGS. 10 through 13.

At 1815, the base station may receive, from the UE, first ACK feedback for the communications based on the target error rate and on a result of the UE decoding the communications. The operations of 1815 may be performed according to the methods described herein. In some examples, aspects of the operations of 1815 may be performed by a normal feedback receiver as described with reference to FIGS. 10 through 13.

At 1820, the base station may receive, from the UE, a second ACK feedback for the communications based on the proxy ACK feedback configuration, where the second ACK feedback is associated with a proxy target error rate that is greater than the target error rate. The operations of 1820 may be performed according to the methods described herein. In some examples, aspects of the operations of 1820 may be performed by a proxy feedback receiver as described with reference to FIGS. 10 through 13.

At 1825, the base station may update outer loop power settings for the communications associated with the target error rate based on receiving the second ACK feedback. The operations of 1825 may be performed according to the methods described herein. In some examples, aspects of the operations of 1825 may be performed by an outer-loop adjustment component as described with reference to FIGS. 10 through 13.

At 1830, the base station may transmit, to the UE, additional communications associated with the target error rate in accordance with the updated outer loop power settings. The operations of 1830 may be performed according to the methods described herein. In some examples, aspects of the operations of 1830 may be performed by an outer-loop adjustment component as described with reference to FIGS. 10 through 13.

Figure 19:
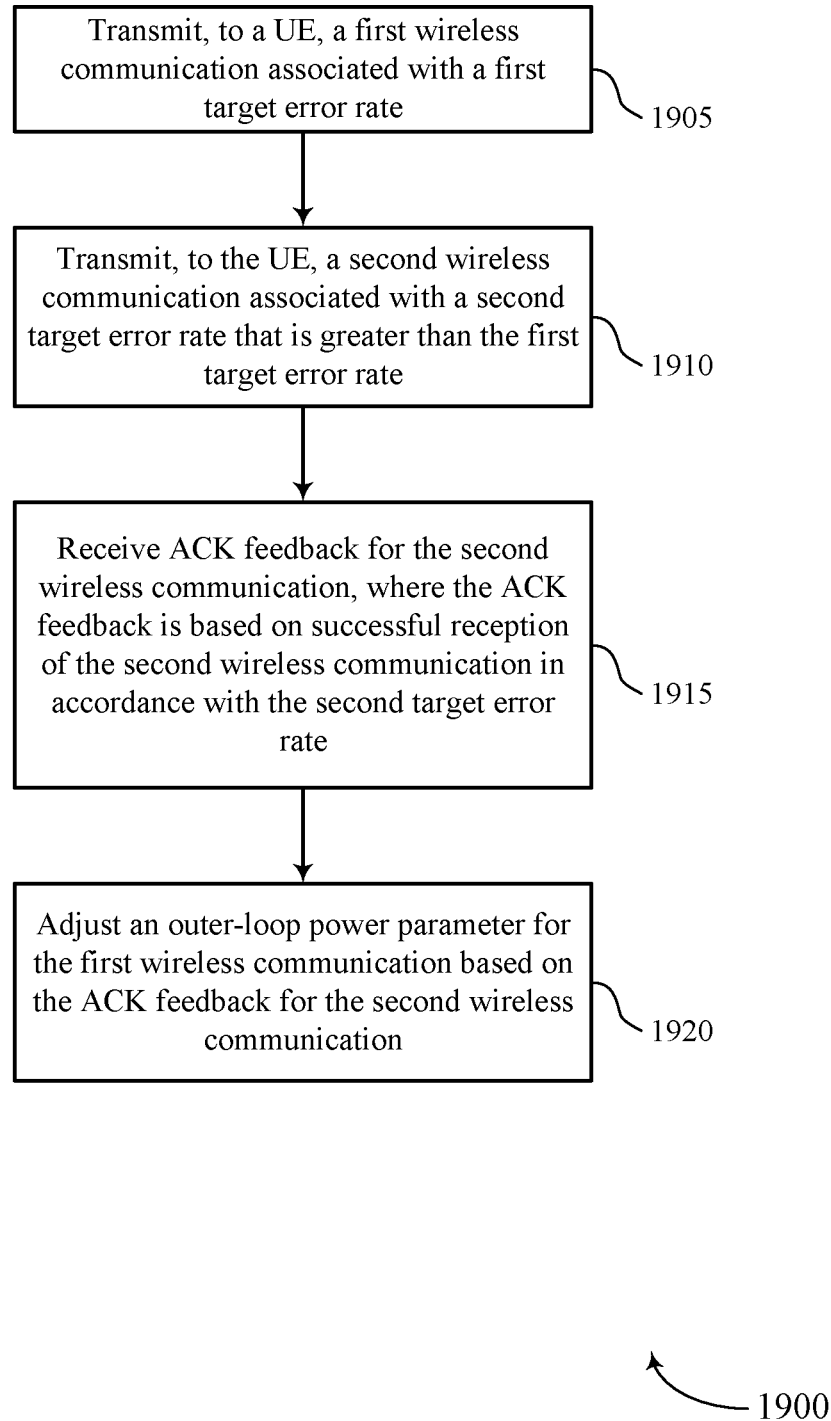

FIG. 19 shows a flowchart illustrating a method 1900 that supports outer-loop feedback support for low error rates in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a first wireless communication associated with a first target error rate. The operations of 1905 may be performed according to the methods described herein. In some examples, aspects of the operations of 1905 may be performed by a low-BLER communications transmitter as described with reference to FIGS. 10 through 13.

At 1910, the base station may transmit, to the UE, a second wireless communication associated with a second target error rate that is greater than the first target error rate. The operations of 1910 may be performed according to the methods described herein. In some examples, aspects of the operations of 1910 may be performed by a high-BLER communications transmitter as described with reference to FIGS. 10 through 13.

At 1915, the base station may receive ACK feedback for the second wireless communication, where the ACK feedback is based on successful reception of the second wireless communication in accordance with the second target error rate. The operations of 1915 may be performed according to the methods described herein. In some examples, aspects of the operations of 1915 may be performed by a high-BLER feedback receiver as described with reference to FIGS. 10 through 13.

At 1920, the base station may adjust an outer-loop power parameter for the first wireless communication based on the ACK feedback for the second wireless communication. The operations of 1920 may be performed according to the methods described herein. In some examples, aspects of the operations of 1920 may be performed by an outer-loop adjustment component as described with reference to FIGS. 10 through 13.

Figure 20:
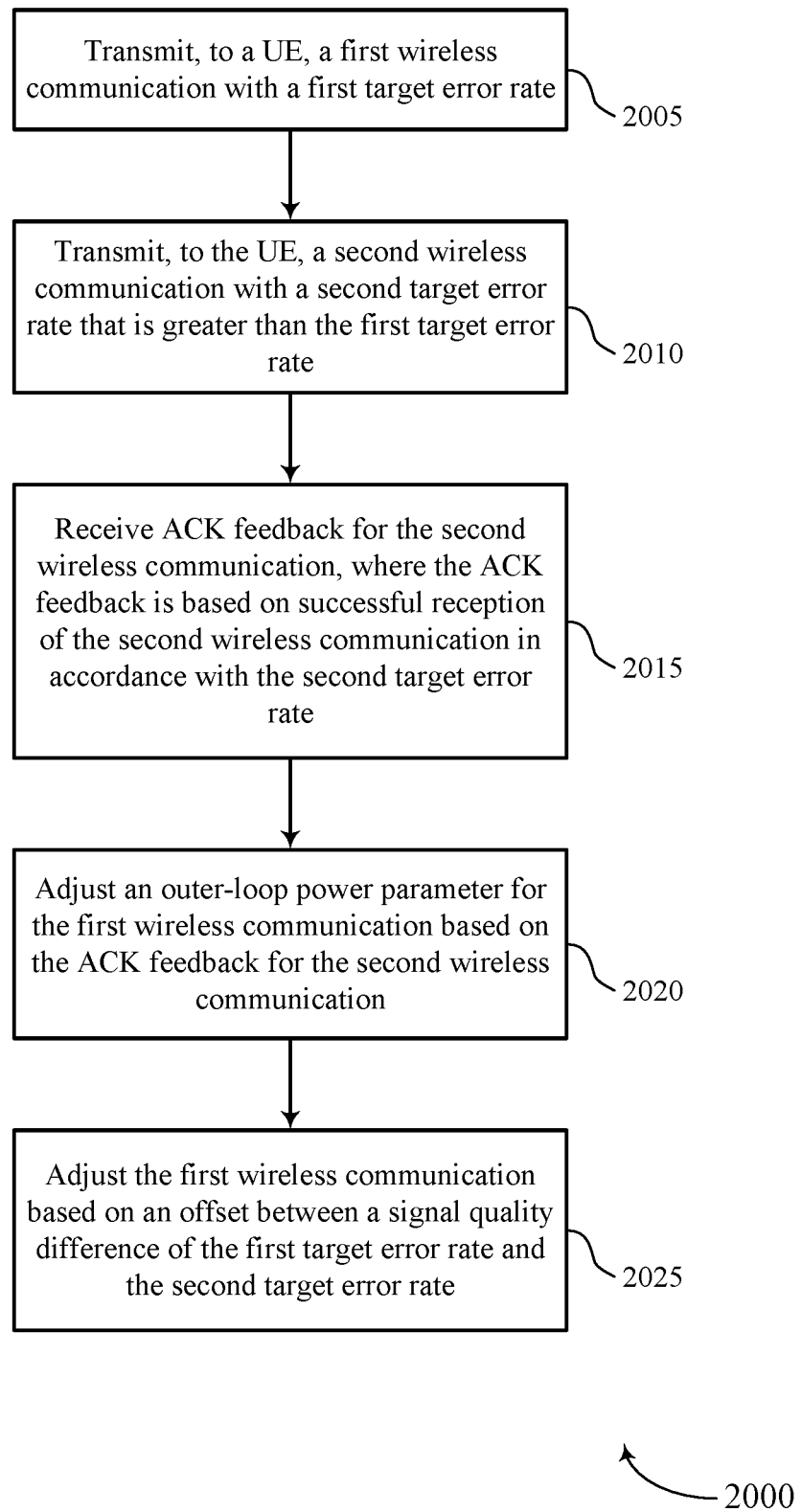

FIG. 20 shows a flowchart illustrating a method 2000 that supports outer-loop feedback support for low error rates in accordance with aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a first wireless communication associated with a first target error rate. The operations of 2005 may be performed according to the methods described herein. In some examples, aspects of the operations of 2005 may be performed by a low-BLER communications transmitter as described with reference to FIGS. 10 through 13.

At 2010, the base station may transmit, to the UE, a second wireless communication associated with a second target error rate that is greater than the first target error rate. The operations of 2010 may be performed according to the methods described herein. In some examples, aspects of the operations of 2010 may be performed by a high-BLER communications transmitter as described with reference to FIGS. 10 through 13.

At 2015, the base station may receive ACK feedback for the second wireless communication, where the ACK feedback is based on successful reception of the second wireless communication in accordance with the second target error rate. The operations of 2015 may be performed according to the methods described herein. In some examples, aspects of the operations of 2015 may be performed by a high-BLER feedback receiver as described with reference to FIGS. 10 through 13.

At 2020, the base station may adjust an outer-loop power parameter for the first wireless communication based on the ACK feedback for the second wireless communication. The operations of 2020 may be performed according to the methods described herein. In some examples, aspects of the operations of 2020 may be performed by an outer-loop adjustment component as described with reference to FIGS. 10 through 13.

At 2025, the base station may adjust the first wireless communication based on an offset between a signal quality difference of the first target error rate and the second target error rate. The operations of 2025 may be performed according to the methods described herein. In some examples, aspects of the operations of 2025 may be performed by an outer-loop adjustment component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a proxy acknowledgement feedback configuration for communications associated with a target error rate that is below a threshold target error rate;
   receiving, from the base station, the communications associated with the target error rate;
   transmitting, to the base station, a first acknowledgement feedback for the communications based at least in part on the target error rate and on decoding the communications; and
   transmitting, to the base station, a second acknowledgement feedback for the communications based at least in part on the proxy acknowledgement feedback configuration, wherein the second acknowledgement feedback is associated with a proxy target error rate that is greater than the target error rate.

2. The method of claim 1, further comprising:
   receiving an indication that the UE is to determine the second acknowledgement feedback based on a subset of log likelihood ratios (LLRs) to be used for the communications.

3. The method of claim 2, further comprising:
   receiving, via the indication, a proxy down-sampling rate that is less than a down-sampling rate of the communications;
   decoding the communications according to the proxy down-sampling rate, wherein the subset of LLRs includes LLRs decoded in accordance with the proxy down-sampling rate; and
   determining the second acknowledgement feedback based at least in part on the decoding in accordance with the proxy down-sampling rate.

4. The method of claim 2, further comprising:
   decoding a random selection of LLRs of the communications, wherein the subset of LLRs includes the random selection of LLRs; and
   determining the second acknowledgement feedback based at least in part on the decoding of the random selection of LLRs.

5. The method of claim 2, wherein receiving the indication comprises:
   receiving the indication as part of the proxy acknowledgement feedback configuration via radio resource control (RRC) signaling or as part of a downlink control information (DCI) message.

6. The method of claim 1, further comprising:
   receiving an indication that the UE is to determine the second acknowledgement feedback based on an intermediate decoding of the communications.

7. The method of claim 6, further comprising:
   receiving, via the indication, a number of decoding iterations to be used for the intermediate decoding, wherein the number of decoding iterations is less than a total number of decoding iterations to be used by the UE for decoding an entirety of the communications and is associated with the intermediate decoding;
   decoding the communications according to the number of decoding iterations; and
   determining the second acknowledgement feedback based at least in part on the decoding by the number of decoding iterations.

8. The method of claim 7, wherein the number of decoding iterations corresponds to the proxy target error rate that is greater than the target error rate.

9. The method of claim 6, wherein receiving the indication comprises:
   receiving the indication as part of the proxy acknowledgement feedback configuration via radio resource control (RRC) signaling or as part of a downlink control information (DCI) message.

10. The method of claim 1, further comprising:
    multiplexing the first acknowledgement feedback with the second acknowledgement feedback.

11. The method of claim 10, wherein the second acknowledgement feedback is transmitted less frequently than the first acknowledgement feedback.

12. The method of claim 1, wherein the communications associated with the target error rate that is below the threshold target error rate comprise ultra-reliable low latency communications (URLLC).

13. An apparatus for wireless communications at a user equipment (UE), comprising:
    a processor,
    memory coupled with the processor; and
    instructions stored in the memory and executable by the processor to cause the apparatus to:
      receive, from a base station, a proxy acknowledgement feedback configuration for communications associated with a target error rate that is below a threshold target error rate;
      receive, from the base station, the communications associated with the target error rate;
      transmit, to the base station, a first acknowledgement feedback for the communications based at least in part on the target error rate and on decoding the communications; and
      transmit, to the base station, a second acknowledgement feedback for the communications based at least in part on the proxy acknowledgement feedback configuration, wherein the second acknowledgement feedback is associated with a proxy target error rate that is greater than the target error rate.

14. The apparatus of claim 13, wherein the instructions are further executable by the processor to cause the apparatus to:
    receive an indication that the UE is to determine the second acknowledgement feedback based on a subset of log likelihood ratios (LLRs) to be used for the communications.

15. The apparatus of claim 14, wherein the instructions are further executable by the processor to cause the apparatus to:
    receive, via the indication, a proxy down-sampling rate that is less than a down-sampling rate of the communications;
    decode the communications according to the proxy down-sampling rate, wherein the subset of LLRs includes LLRs decoded in accordance with the proxy down-sampling rate; and determine the second acknowledgement feedback based at least in part on the decoding in accordance with the proxy down-sampling rate.

16. The apparatus of claim 14, wherein the instructions are further executable by the processor to cause the apparatus to:
decode a random selection of LLRs of the communications, wherein the subset of LLRs includes the random selection of LLRs; and
determine the second acknowledgement feedback based at least in part on the decoding of the random selection of LLRs.

17. The apparatus of claim 14, wherein the instructions to receive the indication are executable by the processor to cause the apparatus to:
receive the indication as part of the proxy acknowledgement feedback configuration via radio resource control (RRC) signaling or as part of a downlink control information (DCI) message.

18. The apparatus of claim 13, wherein the instructions are further executable by the processor to cause the apparatus to:
receive an indication that the UE is to determine the second acknowledgement feedback based on an intermediate decoding of the communications.

19. The apparatus of claim 18, wherein the instructions are further executable by the processor to cause the apparatus to:
receive, via the indication, a number of decoding iterations to be used for the intermediate decoding, wherein the number of decoding iterations is less than a total number of decoding iterations to be used by the UE for decoding an entirety of the communications and is associated with the intermediate decoding;
decode the communications according to the number of decoding iterations; and
determine the second acknowledgement feedback based at least in part on the decoding by the number of decoding iterations.

20. The apparatus of claim 18, wherein the instructions to receive the indication are executable by the processor to cause the apparatus to:
receive the indication as part of the proxy acknowledgement feedback configuration via radio resource control (RRC) signaling or as part of a downlink control information (DCI) message.

21. The apparatus of claim 18, wherein a number of decoding iterations corresponds to the proxy target error rate that is greater than the target error rate.

22. The apparatus of claim 13, wherein the instructions are further executable by the processor to cause the apparatus to:
multiplex the first acknowledgement feedback with the second acknowledgement feedback.

23. The apparatus of claim 22, wherein the second acknowledgement feedback is transmitted less frequently than the first acknowledgement feedback.

24. The apparatus of claim 13, wherein the communications associated with the target error rate that is below the threshold target error rate comprise ultra reliable low latency communications (URLLC).

25. An apparatus for wireless communications at a user equipment (UE), comprising:
means for receiving, from a base station, a proxy acknowledgement feedback configuration for communications associated with a target error rate that is below a threshold target error rate;
means for receiving, from the base station, the communications associated with the target error rate;
means for transmitting, to the base station, a first acknowledgement feedback for the communications based at least in part on the target error rate and on decoding the communications; and
means for transmitting, to the base station, a second acknowledgement feedback for the communications based at least in part on the proxy acknowledgement feedback configuration, wherein the second acknowledgement feedback is associated with a proxy target error rate that is greater than the target error rate.

26. A non-transitory computer-readable medium storing code for wireless communications at a user equipment (UE), the code comprising instructions executable by a processor to:
receive, from a base station, a proxy acknowledgement feedback configuration for communications associated with a target error rate that is below a threshold target error rate;
receive, from the base station, the communications associated with the target error rate;
transmit, to the base station, a first acknowledgement feedback for the communications based at least in part on the target error rate and on decoding the communications; and
transmit, to the base station, a second acknowledgement feedback for the communications based at least in part on the proxy acknowledgement feedback configuration, wherein the second acknowledgement feedback is associated with a proxy target error rate that is greater than the target error rate.

* * * * *